(12) United States Patent
McDonald, Jr. et al.

(10) Patent No.: US 6,882,740 B1
(45) Date of Patent: Apr. 19, 2005

(54) SYSTEM AND METHOD FOR DETERMINING A SEED VIGOR INDEX FROM GERMINATED SEEDLINGS BY AUTOMATIC SEPARATION OF OVERLAPPED SEEDLINGS

(75) Inventors: Miller Baird McDonald, Jr., Dublin, OH (US); Kikuo Fujimura, Palo Alto, CA (US); Mark Alan Bennett, Columbus, OH (US); Yusaku Sako, San Jose, CA (US); Andrew Frederick Evans, Westerville, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 319 days.

(21) Appl. No.: 09/591,432

(22) Filed: Jun. 9, 2000

(51) Int. Cl.[7] ................................................. G06K 9/00
(52) U.S. Cl. ....................... 382/110; 382/199; 382/203; 382/256; 382/257; 382/258; 382/259; 348/89; 356/634; 702/128; 702/159; 47/1.01 R; 47/58.1 R; 47/58.1 LS; 47/58.1 SE
(58) Field of Search ................................. 382/110, 199, 382/203, 256, 257, 258, 259; 47/1.01 R, 58.1 R, 58.1 LS, 58.1 SE; 348/89; 356/634; 702/128, 159

(56) References Cited

U.S. PATENT DOCUMENTS

| | | | |
|---|---|---|---|
| 3,852,914 A | 12/1974 | Levengood | 47/58 |
| 5,073,503 A | 12/1991 | Mee | 436/147 |
| 5,659,623 A * | 8/1997 | Conrad | 382/110 |
| 5,864,984 A | 2/1999 | McNertney | 47/1.01 |
| 5,901,237 A | 5/1999 | Conrad | 382/110 |

OTHER PUBLICATIONS

International Seed Testing Association Seed Vigour Testing Handbook (1987).*
Loomis et al., "Visualizartion of Plant Growth", Proceedings of Visualization, Oct. 18–24, 1997, pp. 475–478.*
"Face Recognition Using Eigenfaces" by Turk, et al., IEEE, pp. 586–591.

(Continued)

Primary Examiner—Leo Boudreau
Assistant Examiner—Patrick L Edwards
(74) Attorney, Agent, or Firm—Calfee, Halter & Griswold LLP

(57) ABSTRACT

A system and method for automatically determining a seed vigor index for a lot of seeds by analysis of a scanned image of a plurality of seedlings grown from lot of seeds, including automatically separating and analyzing overlapped seedlings. According to one aspect of the current invention, seedling analysis software is used to analyze an image of seedlings. The seedling analysis software preferably analyzes both hypocotyl and radicle lengths and thus determines the separation point between the two for each seedling. The seedling analysis software also preferably separates overlapped seedlings, preferably using a simulated annealing technique. According to another aspect of the present invention, a low-cost scanner placed in an inverted configuration in a scanner enclosure is used to generate high-quality, reproducible images of seedlings. According to yet another aspect of the present invention, a method of using ordinary germination boxes, i.e., "sandwich boxes" is used to germinate seedlings that greatly facilitate computer-based analysis. In general, this method comprises placing germination blotter paper in the lid of a sandwich box and growing seedlings within the sandwich box in a nearly vertical (upright) position in a darkened germination chamber. The resulting seedlings produce hypocotyls that grow essentially upward and radicles that grow essentially downward, which greatly facilitates image acquisition of the entire seedling, e.g., with an inverted scanner.

41 Claims, 10 Drawing Sheets

OTHER PUBLICATIONS

"On Generalized Distance Transformation of Digitized Pictures" by Yokoi, et al., *IEEE Transactions on Pattern Aanlysis and Machine Intelligence,* vol. PAMI=3, No. 4, Jul. 1981, pp. 424–443.

"A Transformation for Extracting New Descriptors of Shape" by Blum, pp. 362–380.

"Linear Skeletons from Square Cupboards" by Hilditch, *Pattern Recognition,* pp. 403–420.

"Thinning Algorithms on Rectangular, Hexagonal, and Triangular Arrays" by Deutsch,, *Scientific Applications,* vol. 15, No. 9, pp. 827–837.

"Optimization by Simulated Annealing" by Kirkpatrick, et al., *Science,* vol. 220, No. 4598, May 13, 1983, pp. 671–680.

"A Note on Two Problems in Connexion with Graphs" by Dijkstra, *Numerische Mathematik,* 1, 269–271 (1959).

"A Computer Vision Method for Determining Length of Cheese Shreds" by Ni, et al., *Artificial Intelligence Review,* 12: 27–37, 1998.

"Iterative Improvement Algorithms" pp. 111–114.

"Embryo Elongation and Germination Rates as Sensitive Indicators of Lettuce Seed Quality: Priming and Aging Studies" by Hacisalihoglu, et al., *HortScience,* 34(7): 1240–1243, 1999.

"A determination of the seed vigour and field performance of crisp lettuce seedstocks" by Wurr, et al., *Seed Sci. & Technol.,* 13: 11–17, 1985.

"A computer based system for the recognition of seed shape" by Travis, et al., *Seed Sci. & Technol.,* 13: 813–820, 1985.

"Probit Analysis: A Computer Program for Evaluation of Seed Germination and Viability Loss Rate".

"Viability Testing and Characterization of Germination of Fungal Spores by Automatic Image Analysis" by Paul, et al., *Biotechnology and Bioengineering,* vol. 42, No. 1, pp. 11–23, Jun. 5, 1993.

"Automated Seedling Length Measurement for Germination/Vigor Estimation Using a Casas (Computerized Automated Seed Analysis System" by Keys, et al., *Journal of Seed Technology,* vol. 9, No. 1, p. 40–53, 1984.

"Measuring Root Surface Area and Mean Root Diameter of Peach Seedlings by Digital Image Analysis" by Tagliavani, et al., *HortScience,* 28(11):1129–1130, 1993.

"Automated image analyses for separating plant roots from soil debris elurated from soil cores" by Dowdy, et al. *Plant and Soil,* 200:91–94, 1998.

"Quantification of the Length and Diameter of Root Segments with Public Domain Software" by Dowdy, et al., *Commun. Soil Sci. Plant Anal.,* 26(3&4), 459–468 (1995).

"Automated vigour testing of field vegetables using image analysis" by McCormack, et al., *Seed Sci. & Technol.,* 18, 103–112, 1990.

"NIH Image: A Public Domain Image Processing Program for the Macintosh" by Rasband, et al., *Microbeam Analysis,* 4 (1995) 137–149.

"Easily Accessible Method for Root Length Measurement Using an Image Analysis System" by Tanaka, et al., *Jpn. J. Crop. Sci.,* 64(1): 144–147 (1995).

Advertisement: "Ball Vigor Index" Ball Seed Co., Circle Card No. 442.

Advertisement, "... So, how many usable seedlings will you have?" Ball Seed Co., Circle Card No. 357, Apr. 1995.

"New computer imaging system rates seed vigor" *Grower Talks,* Dec. 1994, p. 12.

"Seedlot Vigor Characteristics of 20 *impatiens* Seedlots" Paradigm Research Corp., Mar. 27, 1995.

"A modified slant board test for vigour testing brassicas" by McCormack, et al., *Plant Varieties and Seeds,* (1990), 81–87.

"Laboratory Vigor Tests Used to Predict Pepper Seedling Field Emergence Performance" by Trawatha, et al., *Crop Sci.,* 30:713–717 (1990).

Letter to Ron Wagner from Dave McNertney at Paradigm Research Corp. regarding sample of test results from the Paradigm seedlot vigor test system dated Mar. 27, 1995.

"Visualizing the Future: The Paradigm Seedlot Vigor Assessment System" Presented to the International Society for Horticultural Science, May 16, 1999 by Dave McNertney, Paradigm Research Corp.

"Seelot Vigor Characteristics of 20 *impatiens* Seedlots" Paradigm Research Corp., Mar. 13, 1995.

Miller B. McDonald, "Standardization of Seed Vigour Tests," Seed Vigour Testing Seminar (editor H. A. van der Venter), 1995, pp. 88–97, International Seed Testing Association, Copenhagen, Denmark.

Seedling Evaluation Handbook, 1992, pp. 39, 43, 76 and 79, Contribution No. 35 to the Handbook on Seed Testing, Association of Official Seed Analysts, Lincoln, Nebraska, USA.

Miller B. McDonald, "Seed Viability, Germination and Vigor: Sorting out the Terminology," Ohio Floriculture Online, Feb. 28, 2000 printing of article from Feb. 1997 archive, http://flori.ag.ohio–state.edu/archive/feb97/seedterm.html, Columbus, Ohio, USA.

Ahmet Korkmaz, Wallace G. Pill and Bruce B. Cobb, "Rate and Synchrony of Seed Germination Influence Growth of Hydroponic Lettuce," HortScience, Feb. 1999, pp. 100–103, vol. 34(1).

Yusaku Sako, "Systems for Seed Vigor Assessment and Seed Classification," Defended Aug. 2000, submitted and published thereafter.

* cited by examiner

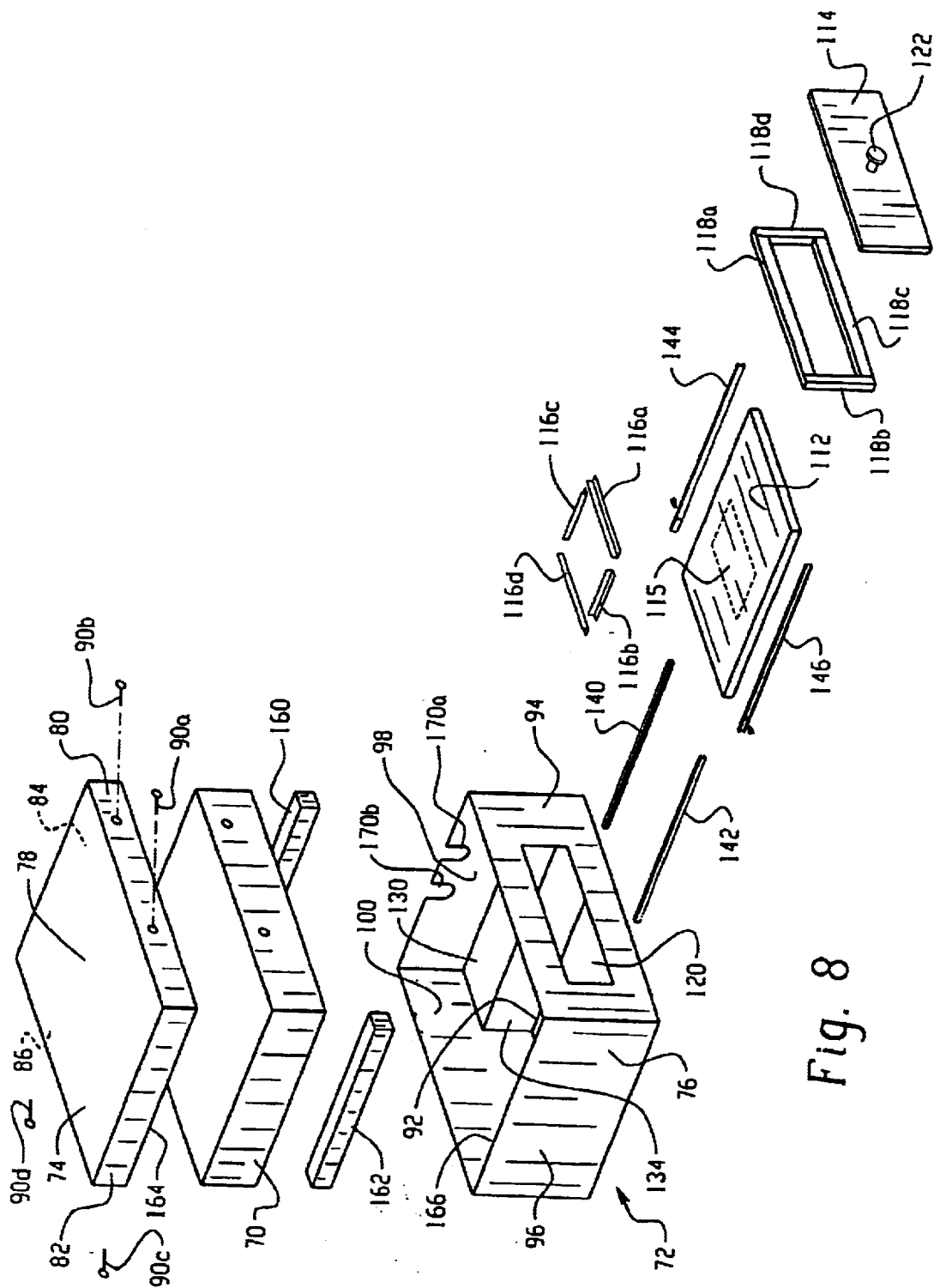

SYSTEM AND METHOD FOR DETERMINING A SEED VIGOR INDEX FROM GERMINATED SEEDLINGS BY AUTOMATIC SEPARATION OF OVERLAPPED SEEDLINGS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

The present invention relates generally to the field of seeds and systems and methods for determining seed vigor, and more specifically to a system and method for automatically determining a seed vigor index by analysis of a scanned image of a plurality of seedlings grown from a lot of seeds, including the ability to automatically separate and analyze overlapped seedlings.

BACKGROUND OF THE INVENTION

Seed vigor testing is a procedure for evaluating the quality of a seed lot based on visually quantifiable cues, such as speed and uniformity of seedling growth. Various specifications for seed vigor testing exist, including the Association of Official Seed Analysts Vigor Testing Handbook (1983) and International Seed Testing Association Seed Vigour Testing Handbook (1987).

Although such tests provide meaningful results to the seed community, they are not routinely performed because of labor intensiveness and subjectivity, which typically varies from seed analyst to seed analyst, even among Registered Seed Technologists (RSTs). Such subjectivity also has hindered the performance of meaningful research into seed vigor, preventing widespread use of seed vigor testing beyond a few key crops. Additionally, the known existing systems for automatically determining seed vigor are overly simple and/or prohibitively expensive, requiring costly cameras and/or special hardware such as special germination chambers.

SUMMARY OF THE INVENTION

The present invention provides a system and method for automatically determining seed vigor index by analysis of a scanned image of a plurality of seedlings grown from a lot of seeds.

According to one aspect of the current invention, seedling analysis software is used to analyze an image of seedlings. The seedling analysis software preferably analyzes both hypocotyl and radicle lengths and thus determines the separation point between the two for each seedling. The seedling analysis software also preferably separates overlapped seedlings, preferably using a simulated annealing technique.

According to another aspect of the present invention, a low-cost scanner placed in an inverted configuration in a scanner enclosure is used to generate high-quality, reproducible images of seedlings.

According to yet another aspect of the present invention, a method of using ordinary germination boxes, i.e., "sandwich boxes" is used to germinate seedlings that greatly facilitate computer-based analysis. In general, this method comprises placing germination blotter paper in the lid of a sandwich box and growing seedlings within the sandwich box in a nearly vertical (upright) position in a darkened germination chamber. The resulting seedlings produce hypocotyls that grow essentially upward and radicles that grow essentially downward, which greatly facilitates image acquisition of the entire seedling, e.g., with an inverted scanner. Additionally, according to this aspect of the present invention, seeds are gently pressed into the moistened blotter paper(s) to help them remain in place when the sandwich box is placed in the nearly vertical position. Additionally, because the seedlings are grown in the lid of the sandwich box, the lid can be separated from the rest of the sandwich box to facilitate image acquisition. In the case of an inverted scanner, the lid and seedlings are placed in a lid-holder, which slides the lid and seedlings under the inverted scanner to facilitate scanning.

It is therefore an advantage of the present invention to provide a system and method for determining a seed vigor index using seedlings grown in the lid of a sandwich box to facilitate image acquisition.

It is also an advantage of the present invention to provide a system and method for determining a seed vigor index using seedling analysis software that analyzes both hypocotyl and radicle lengths as determinants of seed vigor.

It is therefore another advantage of the present invention to provide a system and method for determining a seed vigor index using seedling analysis software that separates overlapped seedlings, preferably with simulated annealing.

It is a further advantage of this invention to provide a system and method for determining a seed vigor index using seedlings grown such that their hypocotyls and radicles are substantially parallel to each other to facilitate image acquisition and analysis.

It is yet another advantage of the present invention to provide a system and method for automatically determining a seed vigor index.

It is yet another advantage of the present invention to provide a system and method for automatically determining a seed vigor index using seedling analysis software that determines a separation point for hypocotyl and radicle for a given seedling, e.g., by analyzing root hairs and secondary roots.

It is still another advantage of the present invention to provide a system and method for automatically determining a seed vigor index using seedling analysis software that analyzes the ratio of the radicle length to the hypocotyl length.

It is yet another advantage of the present invention to provide a system and method for automatically determining a seed vigor index using seedling analysis software that analyzes uniformity of seedlings, e.g., uniformity of hypocotyl length, uniformity of radicle length, uniformity of total length, uniformity of the ratio of the radicle length to the hypocotyl length, and/or the number of dead seeds, and preferably that analyzes standard deviation of hypocotyl length, standard deviation of radicle length, standard deviation of total length, standard deviation of the ratio of the radicle length to the hypocotyl length, and/or the number of dead seeds.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIG. 8 is an exploded view of the of the inverted scanner enclosure of FIG. 4;

REFERENCE TO A COMPUTER PROGRAM LISTING

A computer program listing appendix is filed herewith on a Compact Disc-Recordable (CD-R). The material on the compact disc is hereby incorporated by reference in its entirety. Two identical compact discs have been submitted. Each compact disc contains three files:

| File Name | Size in bytes | Creation Date |
| --- | --- | --- |
| SEEDANLZ.TXT | 22,065 bytes | May 16, 2004 4:20 PM |
| IMAGE.TXT | 49,235 bytes | May 16, 2004 4:19 PM |
| IMGTHINN.TXT | 2,662 bytes | May 16, 2004 4:17 PM |

DETAILED DESCRIPTION OF THE PREFERRED EMBODIMENT

"Circuit communication" as used herein indicates a communicative relationship between devices. Direct electrical and optical connections and indirect electrical and optical connections are examples of circuit communication. Two devices are in circuit communication if a signal from one is received by the other, regardless of whether the signal is modified by some other device. For example, two devices separated by one or more of the following—transformers, optoisolators, digital or analog buffers, analog integrators, other electronic circuitry, fiber optic transceivers, or even satellites—are in circuit communication if a signal from one reaches the other, even though the signal is modified by the intermediate device(s). As a final example, two devices not directly connected to each other, but both capable of interfacing with a third device, e.g., a CPU, are in circuit communication. As used herein, "input" refers to either a signal or a value and "output" refers to either a signal or a value. As used herein, the term "hypocotyl" refers to the portion of a seedling between the cotyledon and the radicle (root or roots) or between the seed coat and the radicle, if a cotyledon is not apparent. As used herein, the hypocotyl starts at the seed coat or cotyledon and ends at the first root hair, which is considered to be the beginning of the seedling radicle. As used herein, the term "overlapped" in the context of overlapped seedlings means seedlings that cross, seedlings that share an edge, and/or seedlings that otherwise form part of a single object in a seedling image (e.g., seedlings that form part of the same object in a binary image determined from an image of seedlings) after the seedling image is processed.

Figure 1:
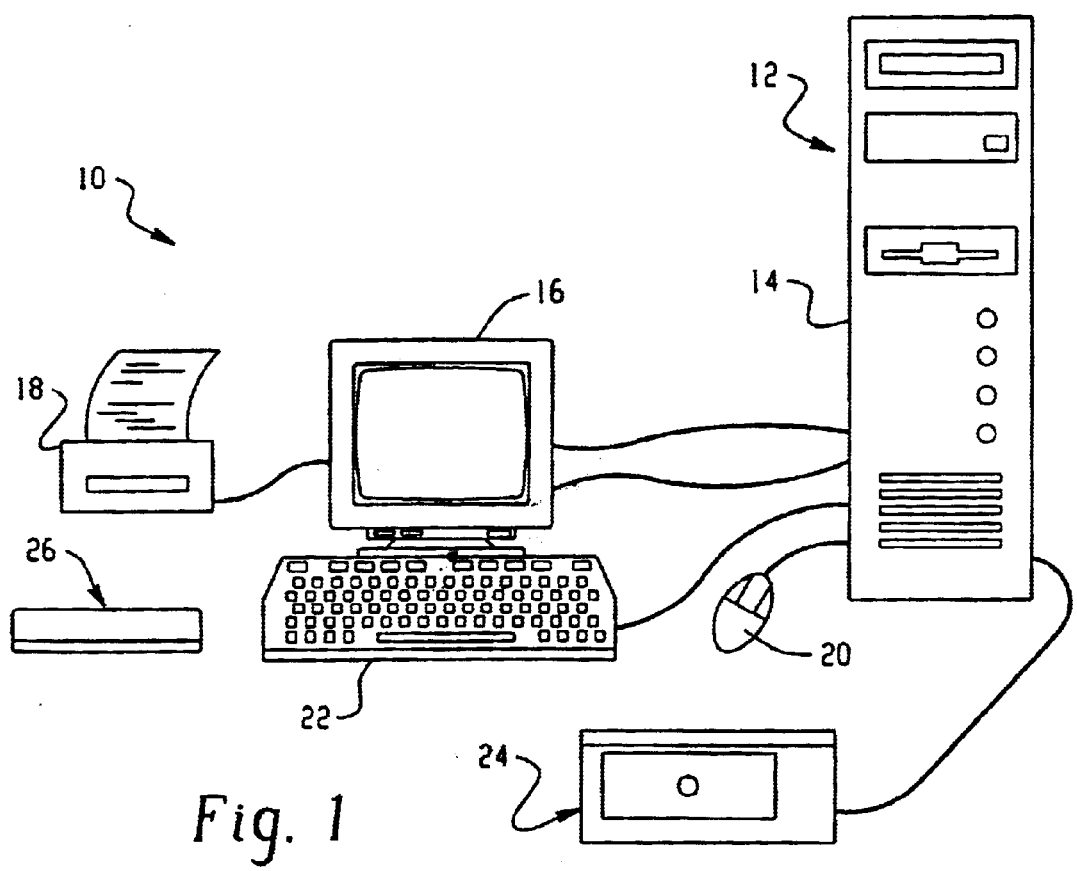
FIG. 1 is a schematic block diagram showing various components of the present system and method.

Referring now to FIG. 1, an overview of certain elements of a system 10 according to the present invention are shown. In the broadest sense, the system 10 of the present invention comprises a system and method for automatically determining a seed vigor index for a batch of seeds. A particular embodiment of that system is shown in FIG. 1. With reference to that figure, the system 10 of the present invention comprises a computer system 12 having a processor unit 14 in circuit communication with one or more display devices, e.g., monitor 16 and/or printer 18, in circuit communication with one or more input devices, e.g., mouse 20 and/or keyboard 22, and in circuit communication with an image capture device to capture an image of one or more seedlings germinated from a representative sample of seeds from the batch of seeds being analyzed. Preferably the image capture device is an inverted scanner 24, i.e., an upside-down scanner, which preferably comprises an ordinary scanner inverted in a special enclosure that holds the scanner in an inverted configuration and holds one or more seedlings proximate to the glass scanning surface of the scanner for scanning. The seedlings to be analyzed are preferably grown using a novel method of using a germination box 26, i.e., a sandwich box 26, to grow seedlings having a specific orientation of hypocotyl and radicle, as will be explained herein.

According to the present invention, the seedlings under analysis are preferably grown in a sandwich box that is vertical or nearly vertical. In the prior art, seedlings are typically grown in sandwich boxes with the longitudinal axis of the sandwich box positioned horizontally. Seedlings grown in such a manner typically have hypocotyls that grow vertically and radicles that grow horizontally, which is not conducive to automatic analysis of a single scan. According to the present invention, seedlings are grown with their hypocotyls generally parallel to their radicles, or at least grown with their hypocotyls essentially in the same plane as their radicles. This is accomplished by allowing the subject seeds to germinate in the dark in a sandwich box that is vertical or nearly vertical. Under such conditions, the seedlings tend to grow with their hypocotyls generally parallel to their radicles, or at least with their hypocotyls in generally the same plane as their radicles, either of which facilitates analysis using a single scan because the scan can include both seedling radicles and seedling hypocotyls. In the dark, seedling hypocotyls tend to grow upward and seedling radicles tend to grow downward. Placing the sandwich box vertical or nearly vertical allows the dark-germinated seedlings to grow so that they essentially lie flat on the blotter paper.

Figure 2:
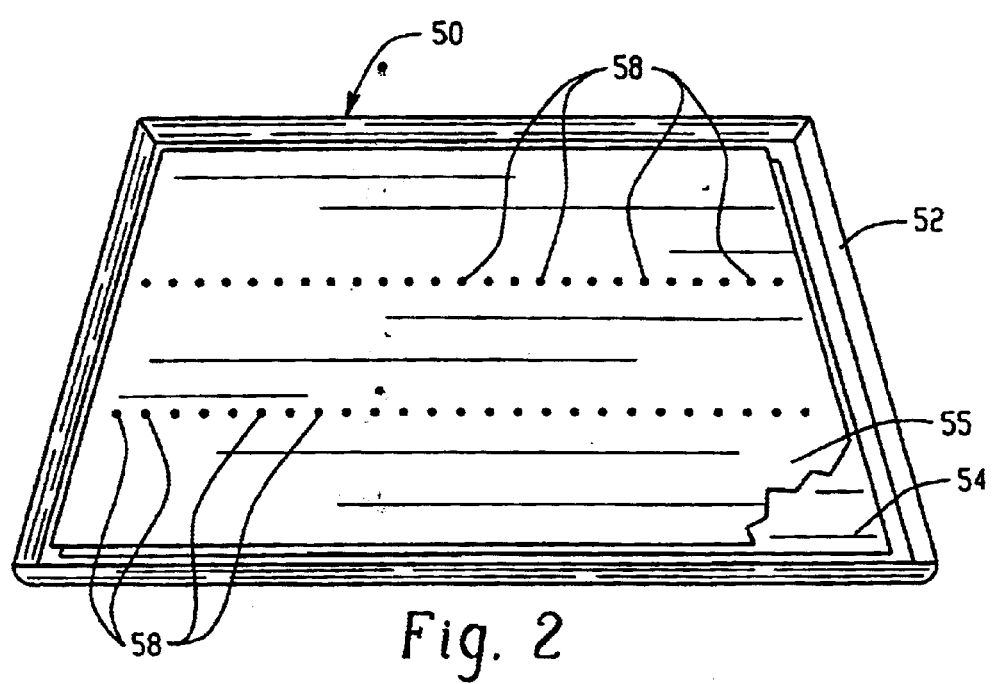
FIG. 2 is a perspective view of a lid of a germination box, i.e., a sandwich box, having several soaked pieces of blotter paper placed therein with a plurality of seeds pressed thereon.

To further facilitate scanning of seedlings, the seedlings are preferably grown on a suitable medium, e.g., blotter paper, in a very shallow container, e.g., a lid of a sandwich box. This facilitates scanning by permitting the shallow container, e.g., the lid of the sandwich box, to be placed proximate to the scanning surface without handling the medium on which the seedlings were grown. Referring now to FIG. 2, a shallow container, i.e., a lid 50 of a sandwich box 26 is shown. The lid 50 preferably has a shallow lip 52. The particular sandwich boxes 26 used in the implementation of this embodiment of the present invention are about 6⅜" by about 9⅝" and use blotter papers that are cut to about 5½" by about 9". These boxes are available from numerous sources known to those in the art, e.g., Model 600C available from Pioneer Packaging, Dixon, Ky. These boxes typically have a hinge and a closing clasp, neither of which are shown in FIG. 2. Although these boxes are preferred because of their size, virtually any sized germination sandwich box could be used, subject to availability. The blotter paper is preferably blue germination blotter paper available from numerous sources known to those in the art, e.g., Anchor Steel Blue Seed Germination Blotter paper available from Anchor Paper Company, St. Paul, Minn. The blue color of this germination paper provides a relatively high contrast with the seedlings and facilitates separating seedlings from the blotter background in the seedling images.

Preferably, two sheets 54, 55 of blotter paper are used to germinate lettuce (*Lactuca sativa* L.) seeds by providing adequate moisture to allow the lettuce seeds to germinate in the germinator. More sheets might be needed to provide adequate moisture for other seeds, e.g., soybeans (*Glycine max* (L.) Merr.). These two sheets 54, 55 are preferably thoroughly wetted with a suitable germination solution, e.g., distilled water. Also shown in FIG. 2 are fifty (50) lettuce seeds 58 arranged in two rows of twenty-five (25) seeds, with the centers of the seeds nominally spaced at about 8.8 mm apart, with the two rows nominally spaced 5.0 cm apart. This arrangement of lettuce seeds tends to minimize overlap between seedlings germinated at 3 days. Seeds can be placed in a proper configuration using any suitable method, including using a vacuum plate known to those in the art, with the vacuum plate having two rows of twenty-five holes each spaced as discussed above. The foregoing spacings are preferred for lettuce seeds. Seeds of different species which are to be germinated into seedlings for analysis may require different spacings. An important criterion is that the seeds be spaced so as to tend to minimize overlap between seedlings. For example, on the one hand, one species of impatiens, Impatiens walleriana, tends to have a single primary root and several shorter secondary roots, and can be germinated using the 2×25 configuration discussed above for lettuce. On the other hand, seedlings of a different species of impatiens, *Impatiens balsamina*, are bigger than the other species and typically have four to six roots of about the same size that fan out, and consequently, their seeds need to be spaced further apart, e.g., 15 mm apart in 2 rows of 15 seeds each, with the rows being 5.0 cm apart. Some species, because of the relatively large size of their seedlings, would not be germinated on blotters but on a different medium more suitable for larger seedlings, e.g., on 10×20 inch paper germination towels. In this situation, the inverted scanner of the present invention might not produce acceptable results and another digital imaging device would be used to capture the appropriate seedling image, such as a digital camera positioned essentially perpendicular to the seedlings, e.g., above the seedlings when positioned horizontally. The seedling analysis software of the present invention would function acceptably well on a seedling image of suitable resolution and quality acquired by virtually any digital imaging device, although some of the software parameters of the present invention might need to be altered to take into account different characteristics of seedling images acquired by different digital imaging devices, e.g., different effective dpi levels.

After the seeds are placed on the two sheets 54, 55 of wet blotter paper, the seeds are preferably gently pressed onto the blotter paper. This pressing depresses the seeds into the surface of the upper piece 55 of blotter paper, which helps prevent the seeds 58 from falling off of the blotter paper when the sandwich box 26 is placed in a vertical or near vertical position in the germinator. A hard plastic plate, e.g., a smaller sandwich box, can be used to gently press the seeds 58 onto the upper sheet 55. Larger seeds can be held in place using the same method, or by sandwiching the seeds between two pieces of moistened germination blotters.

Figure 3:
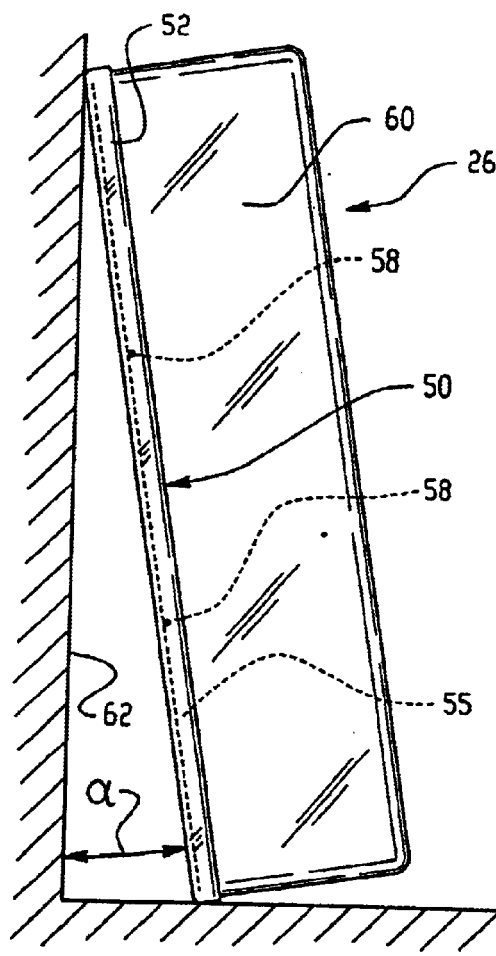
FIG. 3 is a side view of a sandwich box with the base secured to the lid of FIG. 2 and placed in a nearly upright position.

Referring now to FIG. 3, after the seeds are pressed onto the upper sheet 55 of blotter paper, the base 60 of the sandwich box 26 is connected to the lid 50 and placed in a germinator (not shown) in a vertical or nearly vertical position. The angle $\alpha$ between the lid 50 and an imaginary vertical surface 62 is preferably as low as practical ($\alpha=0°$ indicates a vertical orientation) for the specific type of seed being germinated and analyzed. For example, for lettuce, the angle $\alpha$ is preferably between 0° (vertical) and 15°, more preferably between 0° (vertical) and 10° and most preferably 0° (vertical). As another example, for soybeans, the angle $\alpha$ is preferably between 0° (vertical) and 45°, more preferably between 0° (vertical) and 10° and most preferably 0° (vertical). No matter which crop being analyzed, it is desirable and preferable to have the angle $\alpha$ be as close to 0 degrees (vertical) as possible to ensure that the seedling roots (radicles) grow down and the seedling shoots (hypocotyls) grow up, so that they are preferably essentially in the same plane, which facilitates the seedling analysis.

After the seedlings have germinated for a number of days, preferably 3–5 days for certain species, more preferably 3 days for certain species, an image of the seedlings must be taken. Although numerous devices can be used to create an image of the seedlings, e.g., a scanner or a digital camera, it is most preferred to use an inverted scanner, i.e., an upside-down scanner, to generate a digital image of the seedlings. In the alternative, a scanner in the vertical position, nearly vertical position, or some other rotated position (preferably rotated at least 90° from the horizontal) can be used to generate a digital image of the seedlings (under the rationale that if the seedlings can be germinated at a vertical or nearly vertical angle, then they can be scanned at a vertical, nearly vertical angle, or some other angle as well). In either case, the specially enclosed scanner of the present invention has been shown to provide uniform lighting across seedling blotters, which leads to relatively uniform intensity within images and relative uniformity of lighting between scans. Digital cameras, in contrast, can have relatively non-uniform lighting within an image (e.g., "hot spots") and can vary significantly in intensity from image to image. FIGS. 4–8 show an inverted scanner 24 according to the present invention. The inverted scanner 24 comprises a scanner 70 held upside-down in a scanner enclosure 72. A very important criterion for the scanner 70 is that it function inverted, i.e., upside-down. One suitable scanner 70 is a UMAX Astra 2000U scanner, which is commonly available from numerous sources. This scanner and other scanners are typically shipped with a scanner lid (not shown) that would be used to cover the material being scanned during scanning. This lid is removed from the scanner 70 before it is placed in the inverted scanner enclosure 72. The scanner enclosure 72 comprises a scanner lid 74 and a base 76. The scanner lid 74 comprises a lid top 78, front lid face 80, two side lid faces 82, 84, and a rear lid face 86. The four pieces 80, 82, 84, and 86 may be made from sheet metal, bent from extensions of lid top 78, and welded or brazed together at 90° angles to form the lid 74. The scanner 70 is held to the assembled scanner lid 74 with four sheet metal screws 90a–90d extending through holes in pieces 80 and 86 and into the plastic feet or legs of the scanner 70. The scanner base 76 comprises a base bottom 92, front base face 94, two side base faces 96, 98, and a rear base face 100. The four pieces 94, 96, 98, 100 may be made from sheet metal, bent from extensions of base bottom 92, and welded or brazed together at 90° angles to form the base 76.

The inverted scanner 24 has a scanner drawer 110 comprising a drawer base 112 and a drawer face 114 integrally formed with or physically annexed to (e.g., riveted to, bolted to, welded to, brazed to, adhered to, etc.) drawer base 112. The drawer base preferably has a scanning tray 115, which accepts and generally retains in place the to shallow dishes containing the germinated seedlings, e.g., sandwich box lid 50. The tray 115 may be formed from four metal L-brackets 116a–116d which are integrally formed with or physically annexed to (e.g., riveted to, bolted to, welded to, brazed to, adhered to, etc.) drawer base 112. Scanning tray 115 is preferably positioned so that the entire shallow dish (e.g., sandwich box lid 50) is positioned directly below an active scanning area of the scanner 70. The four metal L-brackets 116a–116d are preferably sized so that the shallow dish (e.g., sandwich box lid 50) may be easily placed into the tray 115 for scanning and easily removed therefrom. The front base face 94 of scanner enclosure has an opening 120 therein, through which the drawer base 112 extends. Drawer face 114 has four strips 118a–118d of ⅛" thick rubber about ½" wide secured thereto with suitable adhesive, which form a rectangular light seal, which helps prevent extraneous light from entering the enclosure 72 through opening 120. Drawer face 114 also has a knob or pull 122 used to open and close drawer 110.

Figure 4:
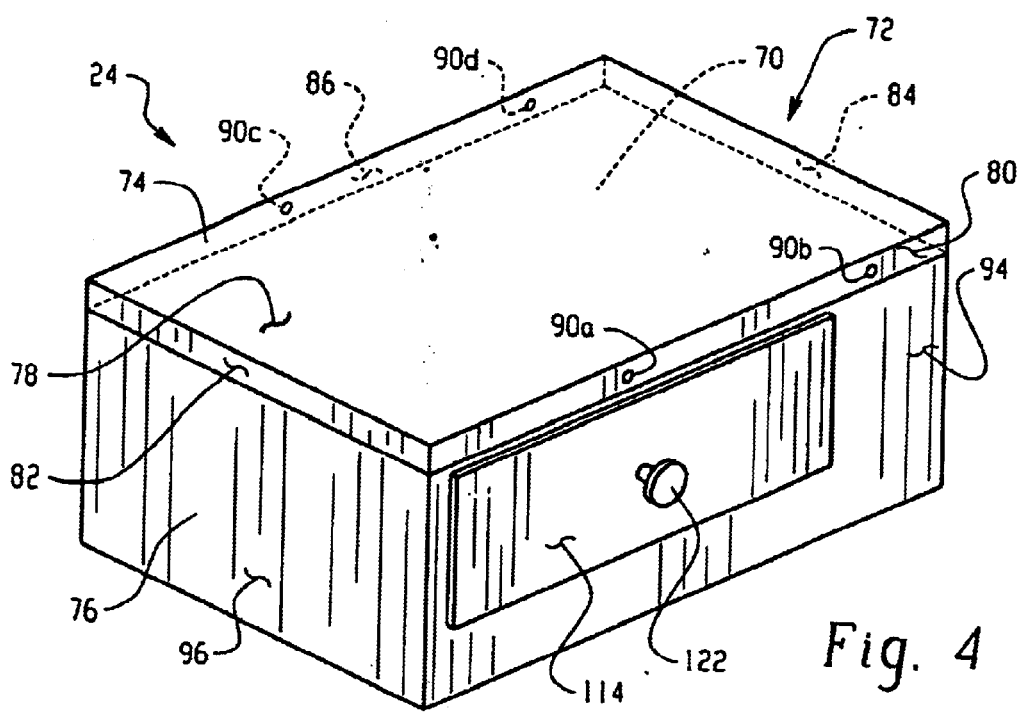
FIG. 4 is a perspective view of an inverted scanner enclosure of the present invention with the scan drawer in the closed/scan position.
Figure 5A:
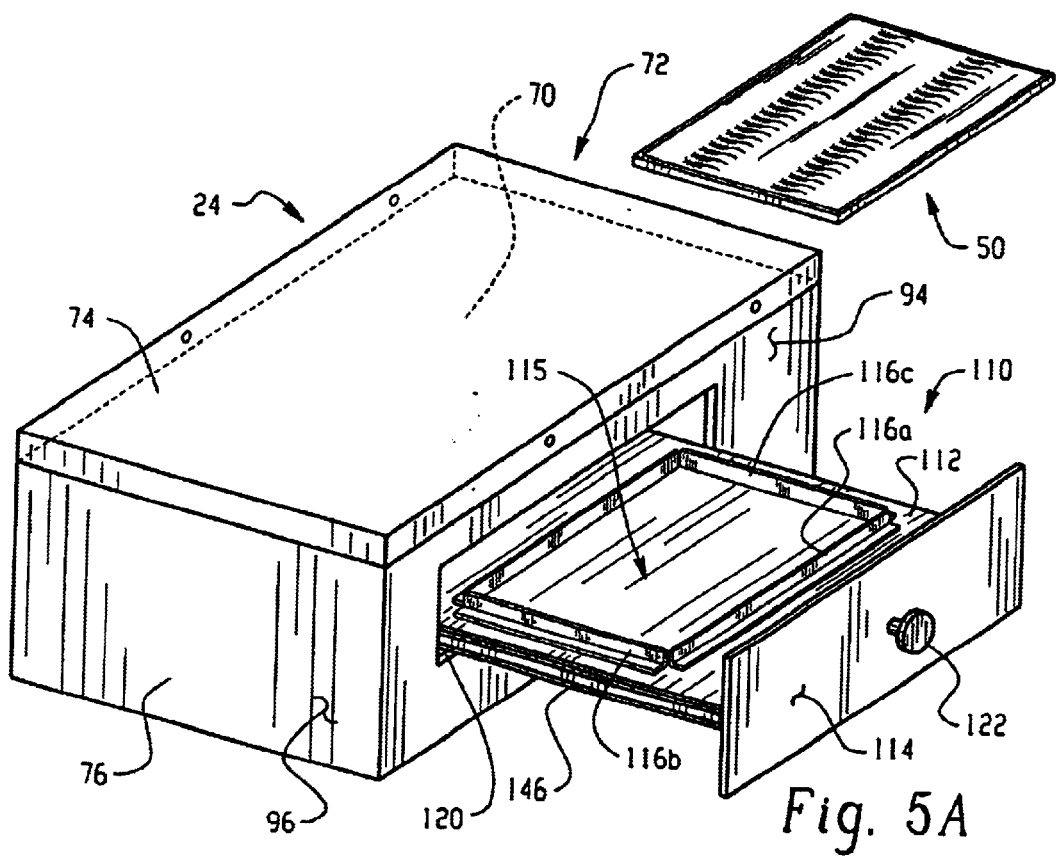
FIG. 5 is a perspective view of the inverted scanner enclosure of FIG. 4 with the scan drawer in the open position, with a sandwich box lid with blotter paper and seedlings held in place by the lid retainer.
Figure 5B:
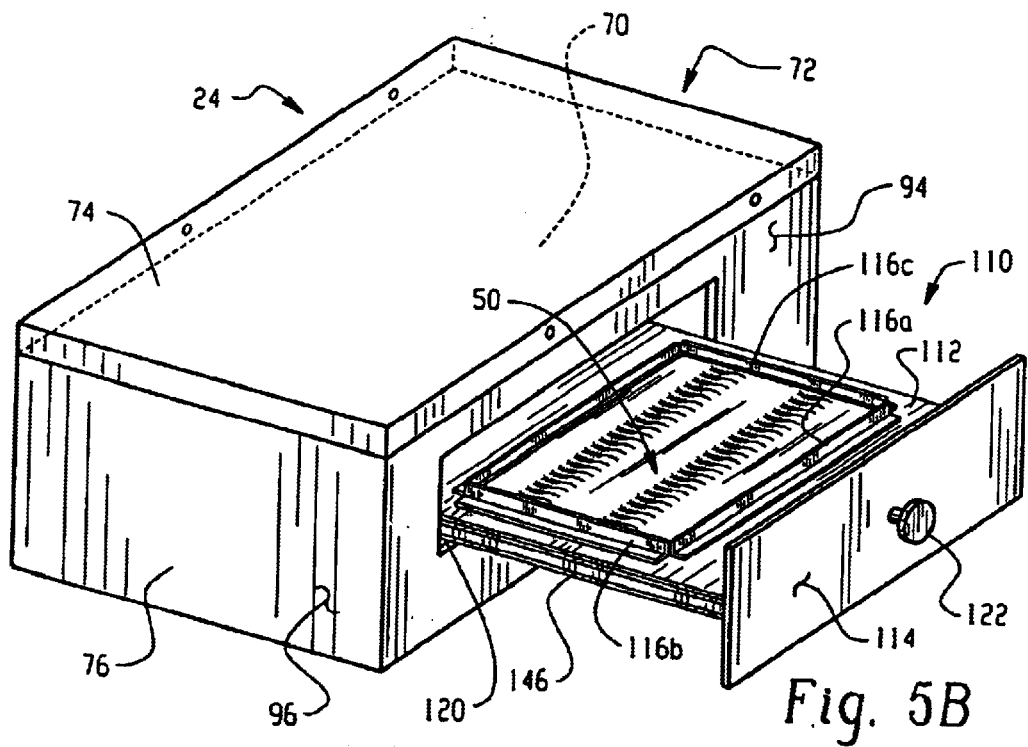
Figure 6:
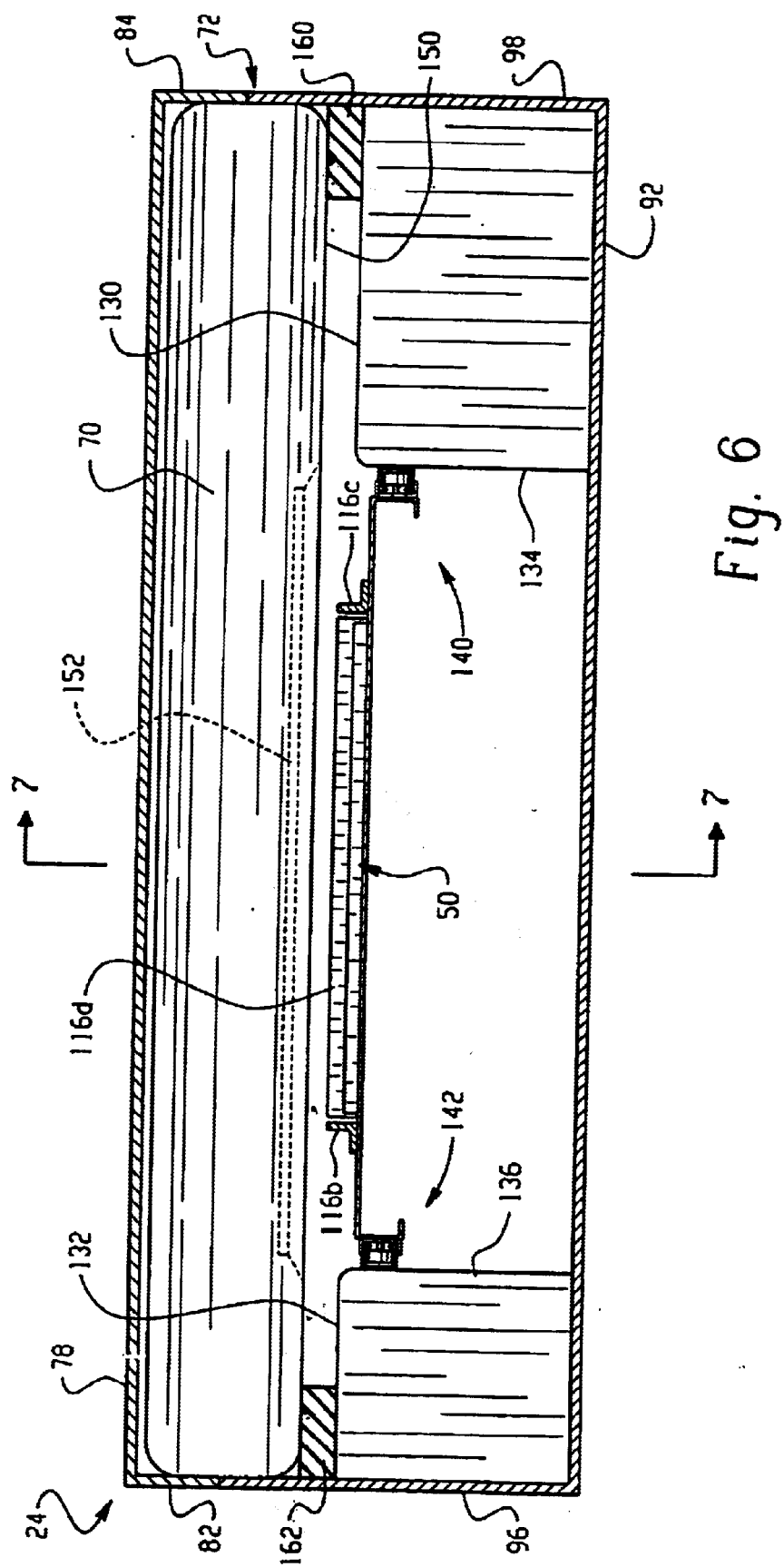
FIG. 6 is a cutaway front view of the inverted scanner enclosure of FIG. 4 with the drawer face, front enclosure face, and front lid face removed to show the position of the scanner relative to the enclosure and lid tray.
Figure 7A:
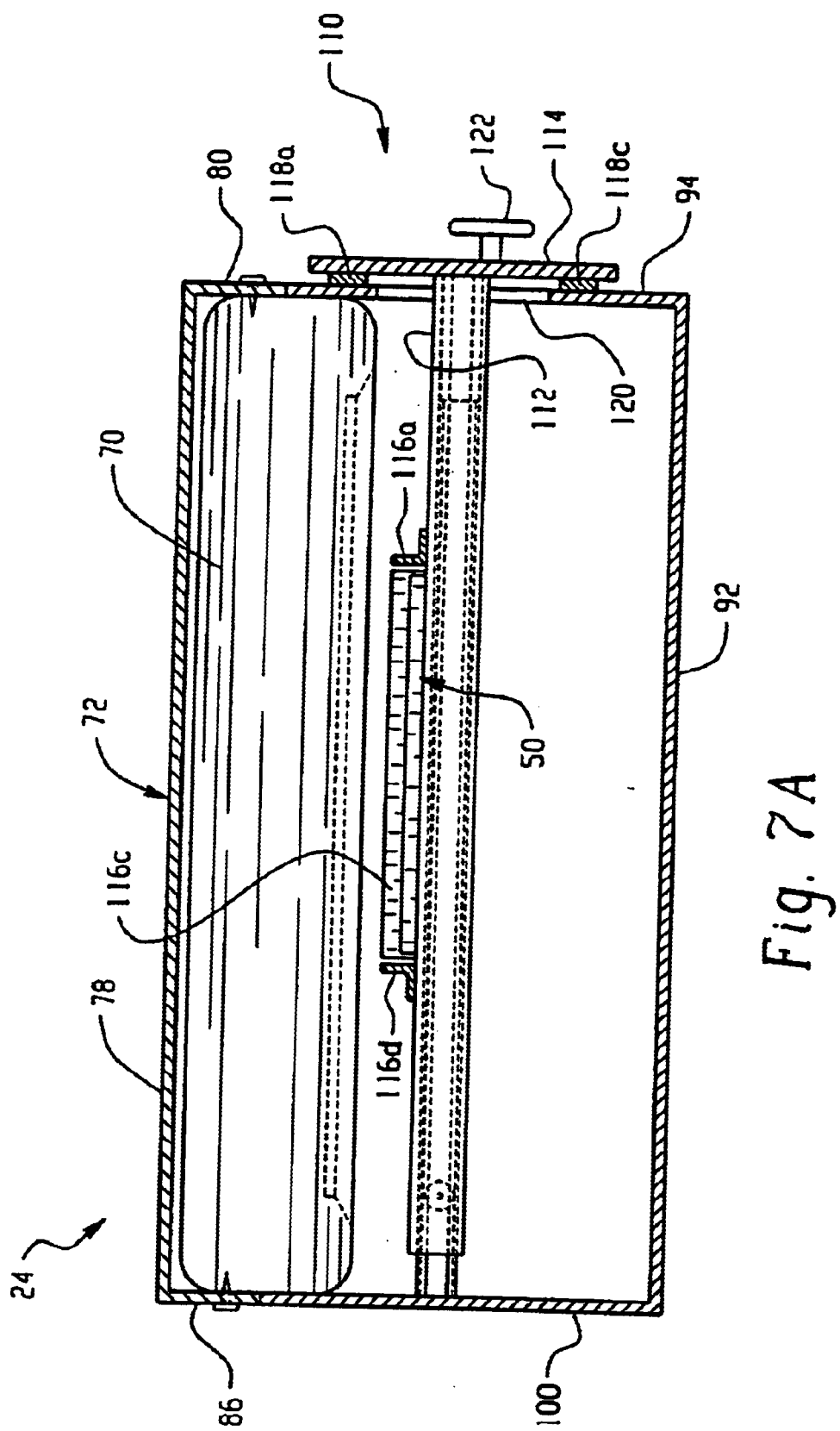
FIG. 7a is a sectional view of the of the inverted scanner enclosure of FIG. 4 taken along the line 7—7 in FIG. 6, with the drawer face, front enclosure face, and front lid face in place and in the scan drawer in the closed position.
Figure 7B:
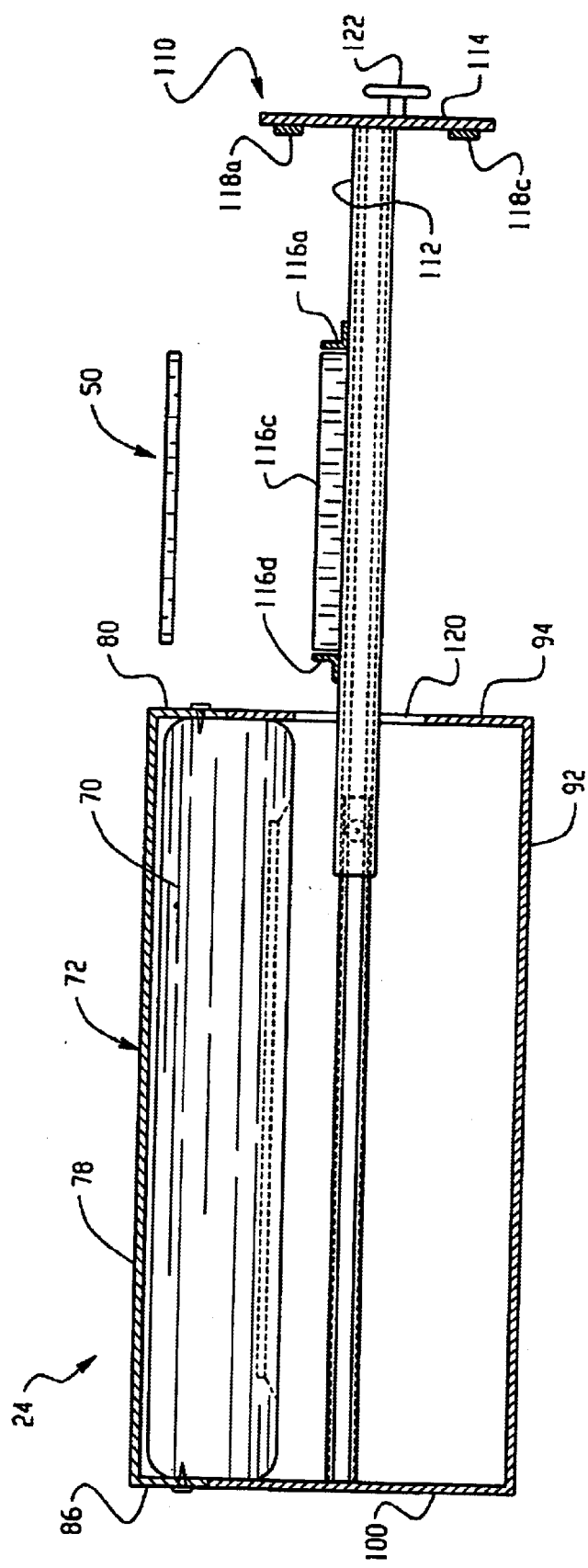
FIG. 7b is a sectional view of the of the inverted scanner enclosure of FIG. 4 taken along the line 7—7 in FIG. 6, with the drawer face, front enclosure face, and front lid face in place and in the scan drawer in the open position.

Inside enclosure 72 are two shelves, a wider shelf 130 and a narrower shelf 132, that support scanner 70. The shelves 130, 132 are preferably formed from pieces of bent sheet metal and are integrally formed with or physically annexed to (e.g., riveted to, bolted to, welded to, brazed to, adhered to, etc.) the base bottom 92, front base face 94, two side base faces 96, 98, and rear base face 100 in the positions shown in the figures. Anterior surfaces 134, 136 of the shelves 130, 132 have physically annexed thereto (e.g., riveted to, bolted to, welded to, brazed to, adhered to, etc.) and support at least one pair of slide brackets 140, 142. Slide brackets 140, 142 accept slides 144, 146 physically annexed to (e.g., riveted to, bolted to, welded to, brazed to, adhered to, etc.) scanner drawer 110 in such a manner that scanner drawer 110 can be moved from the open position to place seedlings on the scanner tray 115 (FIGS. 5a and 5b) and the closed position for scanning (FIG. 4). Roller brackets 140, 142 and rollers 144, 146 of scanner drawer 110 are positioned with respect to anterior surfaces 134, 136 and slide base 112 such that the bottom of scanning tray 115 is positioned about 7/16" below the bottom enclosure plane 150 of inverted scanner 70. Since scanner glass 152 of this particular inverted scanner 70 is located about ⅛" into the bottom enclosure plane 150, the scanning tray 115 is positioned about 9/16" below the bottom of scanner glass 152 of this particular inverted scanner 70. Scanner 70 rests upon two 1" strips of ¼" thick rubber, supported by shelves 130, 132, with the bottom edge 164 of scanner enclosure lid 74 resting upon the upper edge 166 (all the way around) of scanner enclosure base 76. Enclosure base 76 also has openings 170a, 170b through which power and data cables of scanner 70 extend to be placed in circuit communication with a power source and a data acquisition system, e.g., computer system 12.

The inside of enclosure 72 is preferably painted, or otherwise coated or anodized, a black color, preferably matte or flat black, to help prevent stray light inside the enclosure 72 from affecting the scanning procedure.

Although the individual parts of scanner enclosure 72 have been described as being made of metal or sheet metal and physically annexed (e.g., riveted, bolted, welded, brazed, adhered, etc.) together, this description was merely illustrative of one suitable construction method for the inverted scanner 24. In the alternative, most or all of the component parts of scanner enclosure 72 may be formed from any suitable plastic or polymer material and secured using any suitable combination of fasteners, adhesives, and/or welding or brazing. Additionally, in the alternative, rather than placing an off-the-shelf enclosed scanner in a special second, inverted enclosure, the internal parts of a scanner can be placed in a single dedicated inverted scanner enclosure (not shown) having a drawer with a scanning tray that accepts the small containers in which the seedlings are grown (all not shown).

In use, a plurality of seedlings are germinated in accordance with the text accompanying FIGS. 2 and 3 on wet blotter paper in the lid 50 of a sandwich box placed in a vertical or nearly vertical position. After a desired amount of seedling growth, e.g., after a predetermined number of days of growth, e.g., 3 days, the lid 50 is removed from the base 60 of the sandwich box 26 for scanning. With the scanner in an idle mode, the user pulls drawer pull 122 to withdraw drawer 110 far enough out of enclosure base 76 that the lid 50 may be laid into scanning tray 115. Next, the drawer 110 is pushed back into enclosure base 76 so that the rubber lightly 18a–118d engages front face 94. Next, a scan of the seedlings is taken with inverted scanner 70, preferably using the separate scanner interface/scanning program (not shown) that accompanied the scanner 70. The file representing the scan is then saved to a suitable medium, e.g., a fixed disk of a hard disk drive in computer unit 14, preferably with the interface/scanning program that accompanied the scanner 70. A 24-bit scan at 200 dots per inch (dpi) is sufficient to achieve usable results with lettuce seedlings. For other crops, a higher resolution might be needed or a lower resolution might produce adequate results. The area of the scan is set to match the size of the rectangular blotters 54, 55 on which the seedlings were grown. The scan may/may not include regions outside the area of blotters 54, 55.

Figure 9:
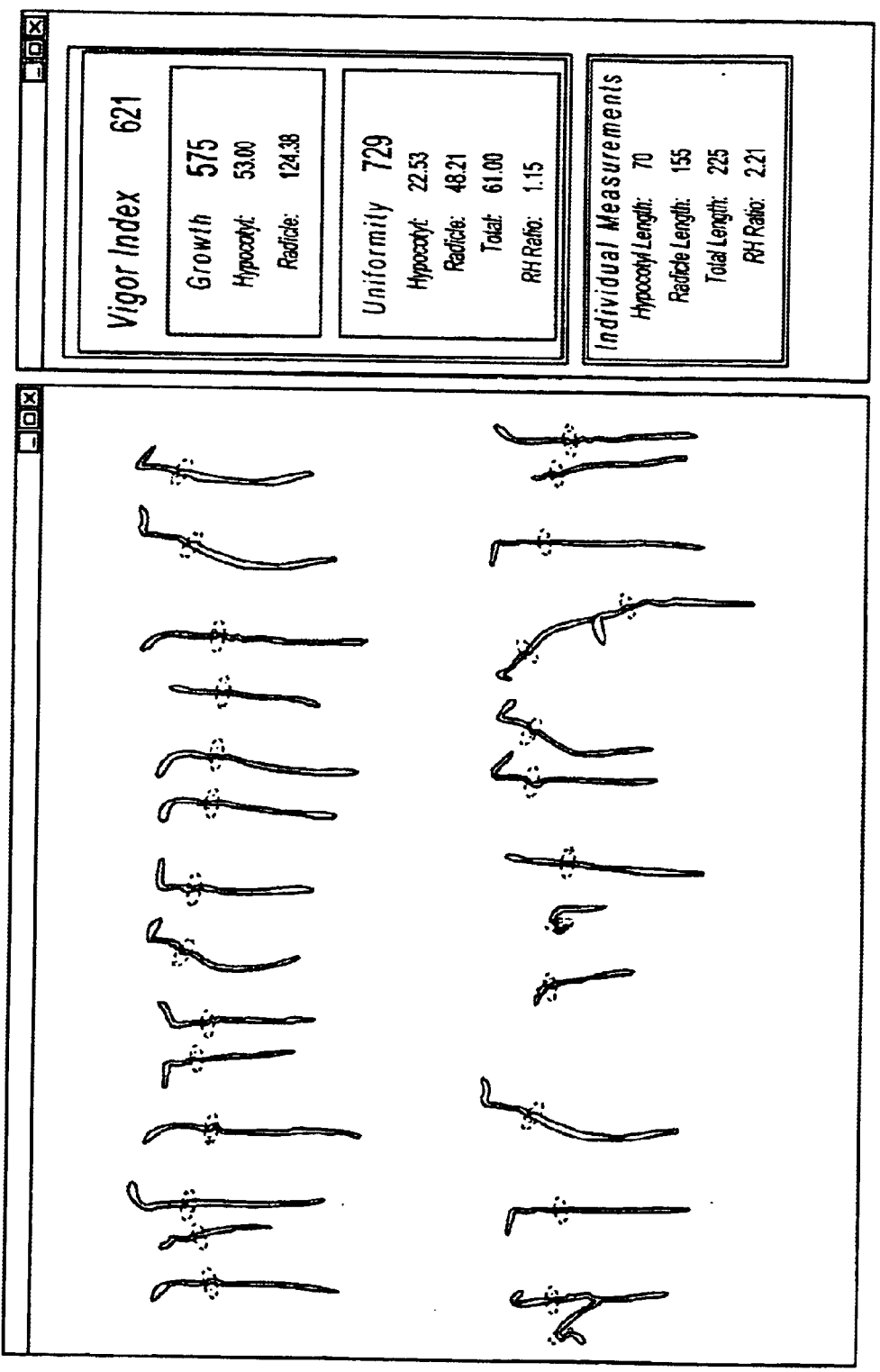
FIG. 9 is a color screenshot of the seedling analysis software of the present invention.

The software of the present invention contains seedling analysis software and other functions associated therewith. The software is preferably a stand-alone executable program that executes on systems operating typical operating systems, e.g., Windows 95 and Windows 98. FIG. 9 is a screenshot 200 captured from the software of the present invention executed on computer system 12 executing Windows 98 as its operating system. Computer system 12 can be a DELL Dimension XPS T600 computer system having a 600 MHz Pentium III processor with 256 MB of memory, placed in circuit communication with inverted scanner 24 via an appropriate communications protocol, e.g., a Universal Serial Bus (USB) communications protocol in the case of the UMAX Astra 2000U scanner.

The screenshot 200 shows icons implementing some of the functions of the software, such as creating a new seed vigor database, opening a seed vigor database, saving a seed vigor database, showing a seed vigor database, opening a seedling image, saving a seedling image, analyzing a blotter of seedlings, analyzing a lot of seeds, generating a histogram of seedling information, and printing. Actuating the "New Database" icon clears the current database stored in system RAM. A database in the seedling analysis software of the present invention comprises the following elements: seed lot ID, date of testing, date of seed acquisition, vigor index, growth value, uniformity value, individual measurements for each seedling (e.g., hypocotyl length, radicle length, total length to radicle length), statistical calculations for the particular seedling image (mean hypocotyl length, mean radicle length, and standard deviation of hypocotyl length, radicle length, total length, and ratio of hypocotyl length to radicle length), weights for the seed vigor index calculation, and comments. Actuating the "Open Database" icon opens a dialog box that prompts the user to enter or select the name of an existing database file. When the dialog box is actuated, the contents of the selected file are loaded into memory as the database. When the "Save Database" icon is pressed, the database contents are written to the opened file or to a new file selected by the user. Actuating the "Show Database" icon opens up a window that displays the contents of the database (e.g., seed lot ID, date of testing, date of seed acquisition, vigor index, growth, uniformity, and comments). Actuating the "Open Image" icon opens a dialog box that prompts the user to enter or select the name of a file corresponding to a scanned image of a blotter and seedlings. When that dialog box is actuated, the file corresponding to the scanned image of a blotter and seedlings is loaded into memory and available for analysis. Actuating the "Save Image" icon saves the image being displayed on the screen to a file in a standard graphic file format, such as either the JPEG or the TIFF file format. Actuating the "Analyze Blot" button initiates software analysis, i.e., the routines of FIGS. 10–12, of the blotter and seedling image currently loaded in memory preferably by actuating the "Open Image" icon. When the software processing is complete for that one image, a seed vigor index and other values are determined from the information determined from that one image, and the test results are output to the screen (see FIG. 9). Actuating the "Analyze Lot" icon opens a dialog box to have the user select a plurality of seedling image(s) of the particular lot being tested for a combined analysis. When the dialog box is actuated, the software analyzes each image individually, in turn, determines the hypocotyl lengths, radicle lengths, etc. of all the seedlings in each image, determines a seed vigor index and other values using the information about all of the seedlings determined from the multiple images, and the combined test results are output to the screen. The "Analyze Lot" function allows a user to combine analyses of more than one image into a single set of seed vigor values for a specific lot of seeds. For example, the standard number of seeds analyzed in seed vigor testing is 200 seeds; with the 50-seeds-per-blotter configuration described herein for certain species, the user would select four images of four different seedlings and blotters for a total of 200 seeds, and the software of the present invention presents a seed vigor index and other values for all 200 seedlings. The user can select virtually any number of blotters for combined analysis via the "Analyze Lot" function. Actuating the "Histogram" icon opens a window that displays the histogram of a user selected parameter such as hypocotyl length, radicle length, and total length. The "Print" icon prints out the image being displayed on the screen to the printer 18. These and other functions can also be executed via menu commands, as known to those skilled in the art.

Figures 10, 11:
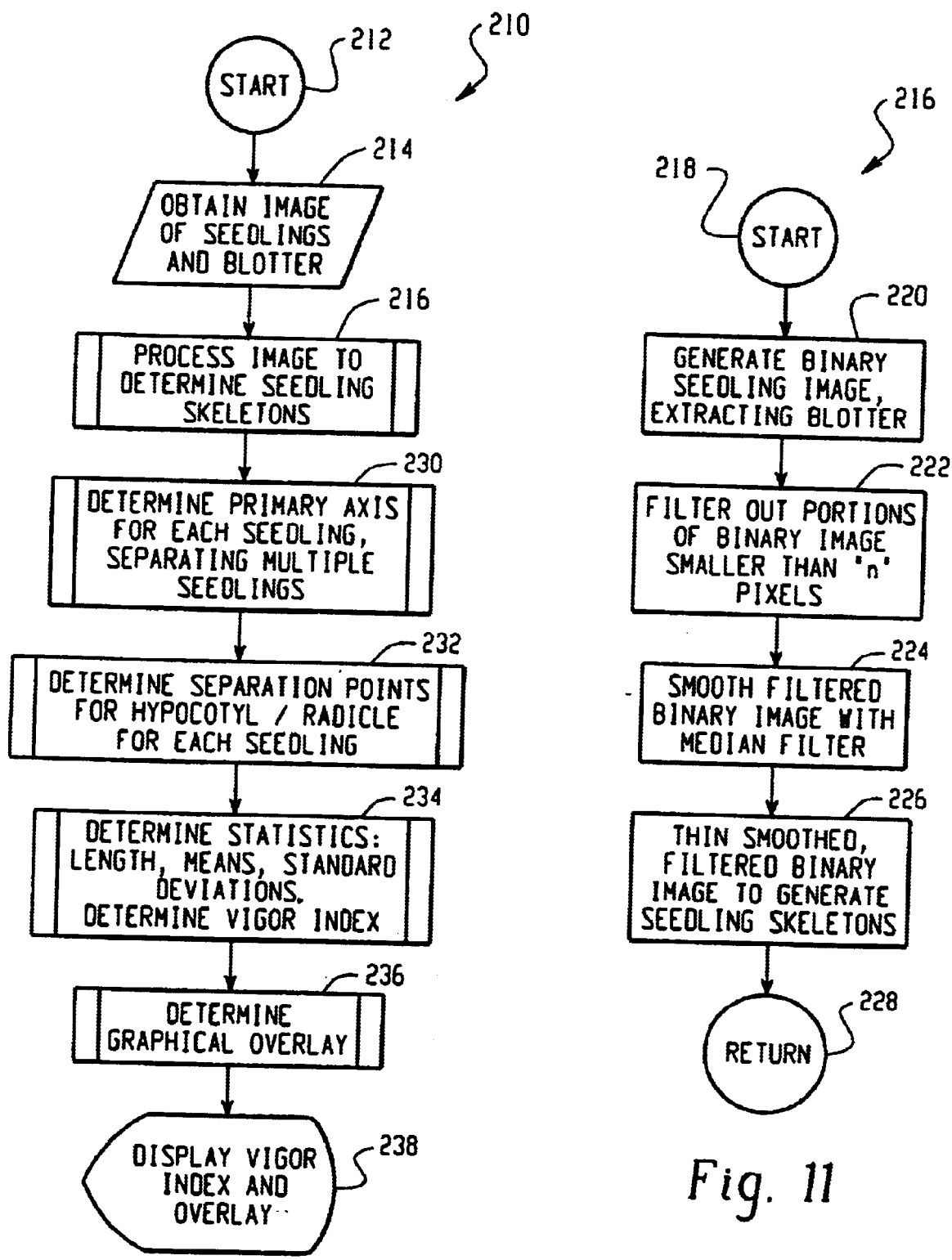
FIG. 10 is a flowchart showing a general overview of the seedling analysis software of the present invention.
FIG. 11 is a flowchart showing generally how the seedling analysis software of the present invention determines seedling skeletons from a digital seedling image.
Figure 12:
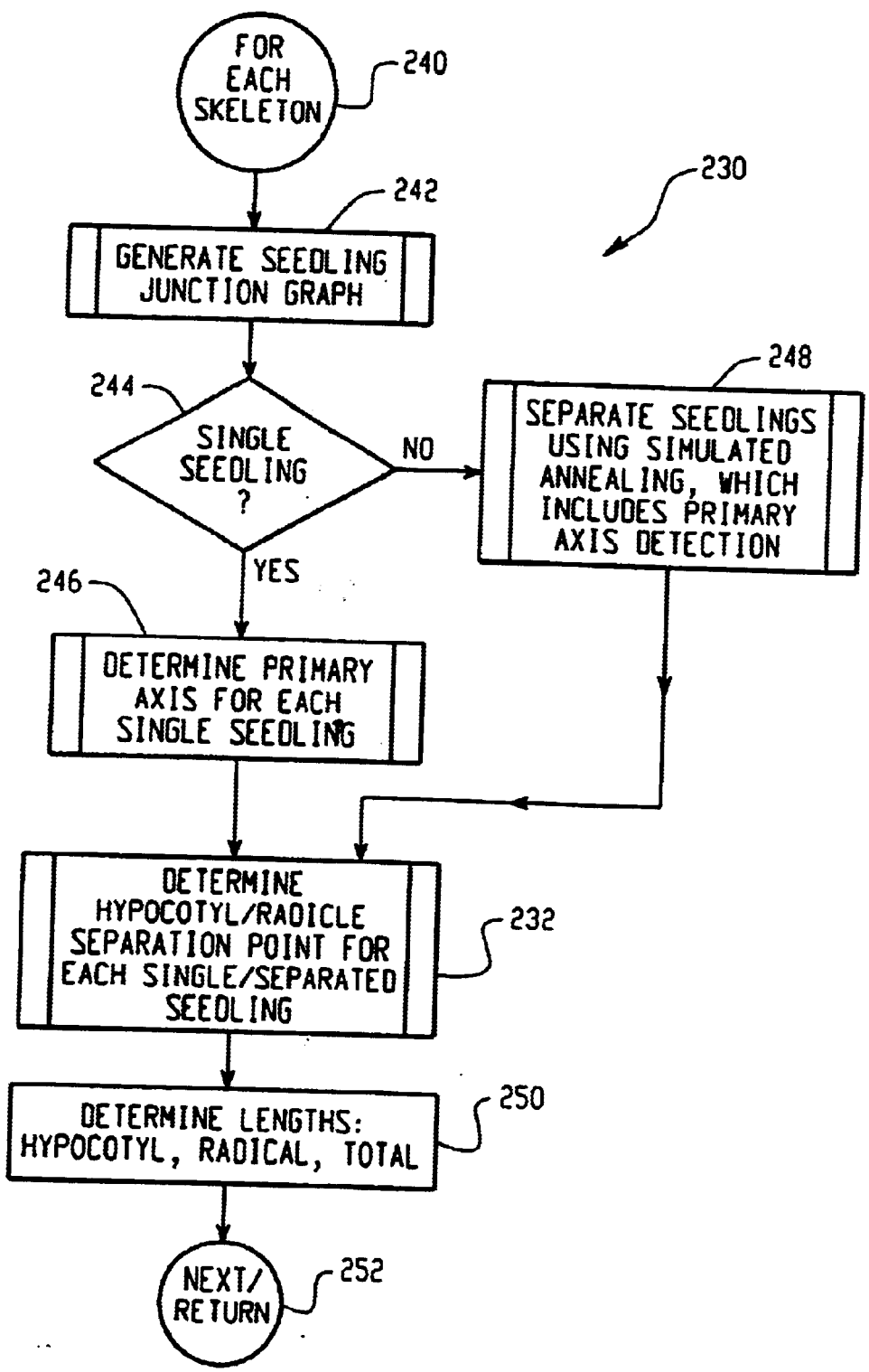
FIG. 12 is a flowchart showing generally how the seedling analysis software of the present invention determines the primary axis for each seedling.

Referring now to FIGS. 10–12, an overview of the seedling analysis software of the present invention is shown. A general overview 210 of the seedling analysis software is found in FIG. 10, which begins at 212. As indicated at 214, the seedling analysis software requires an image of a blotter and seedlings. This preferably takes the form of a data structure corresponding to the scanned image of a blotter and seedlings that was loaded into memory with the "Open Image" icon/function.

The data structure corresponding to the scanned image of a blotter and seedlings is processed by routine 216 to determine seedling skeletons. The seedling skeletons are preferably a locus of adjacent pixels, one pixel wide, that extends from the top of the hypocotyl to the bottom of the primary root of the radicle, roughly through the center of the seedling and includes portions for each structure of the seedling, including all root hairs, etc. FIG. 11 shows additional details about the skeleton determining routine 216, which starts at 218. At task 220, a seedling image is generated by removing the background, i.e., removing the blotter from the image leaving an image of the seedlings. The seedling image generated by step 220 is preferably a binary image of the seedlings (cotyledons, hypocotyls, radicles, root hairs, etc.) of the same size as the original image with the seedlings (cotyledons, hypocotyls, radicles, root hairs, etc.) in the foreground. This binary image is preferably generated using thresholding based on the intensity of red pixels that occur most frequently in the original image. More specifically, the software at task 220 determines the intensity of red $r_{max}$ (on a scale of 0 to 255 for 24-bit color) that occurs most frequently in the original image. The threshold for the thresholding step is then set to $r_{max}$ plus a certain value, preferably 40 for certain plants (such as lettuce). Next, the software at task 220 generates the binary image with pixels meeting the following criterion being in the foreground: a red intensity of between ($r_{max}$+40) and 255, a green intensity of between 0 and 255 (any green intensity), and a blue intensity of between 0 and 255 (any blue intensity). The resulting image is a binary image with the seedlings (cotyledons, hypocotyls, radicles, root hairs, etc.) in the foreground.

Next, at step 222, the binary seedling image generated at step 220 is filtered to remove noise. Under the assumption that noise will take the form of small groups of pixels, this filtering step preferably comprises removing all objects (an object is a contiguous group of pixels) from the image having less than a certain number of pixels. To facilitate the filtering, all the objects in the binary seedling image are preferably labeled and listed in a List of Objects data structure, which includes for each object in the binary seedling image: a unique object label, the bounds of that object ($x_{min}$, $x_{max}$, $y_{min}$, and $y_{max}$), and the number of pixels in that object.

To create the List of Objects, object labeling (also known as connected-component labeling) is used. This is a technique used for extracting connected components (i.e., objects) from a binary image based on a pixel neighborhood system. Typically, a pixel neighborhood system is either 4-connected or 8-connected. In the 4-connected system, a pixel's neighbors (i.e., pixels that are "connected" to the pixel) are the pixels adjacent at north, south, east, and west of the pixel. In the 8-connected system, a pixel's neighbors include the four pixels mentioned as well as northeast, northwest, southeast, and southwest. The object labeling of step 222 is preferably implemented using the 8-connected system; pixels are connected diagonally as well as vertically and horizontally.

In performing the object labeling of step 222, preferably the pixels in the binary image are scanned in raster-scan order. The first block of contiguous foreground pixels (called a "run") in the same row are marked as belonging to the first object. When another run of foreground pixels is encountered in the same row, then the run is labeled as the next object. The next run encountered in the row is marked as the next object, and so on, until the end of the row. When a run is encountered in the next row of pixels, it is labeled as a new object unless any of its pixels are connected to runs in the row above. If the run is connected to only one run in the upper row, then the same label is used for the run as the one for the run above. If the run is connected to two or more runs, then the label for the run is the first run encountered in the above row, and the labels for the other connected runs are relabeled as equivalent to that label. These equivalent labels are rewritten to the representative label by performing another raster scan. At the end of the whole procedure, each connected component (i.e., each object) has a unique label. For each object, the bounds and size in pixels are determined.

Having generated a List of Objects for the binary seedling image generated at step 220, the filtering process can be done by removing all objects from the list having fewer than a predetermined number of pixels, preferably fewer than 100 pixels for certain plants (such as lettuce scanned at 200 dpi). Next, from this filtered List of Objects, a filtered binary seedling image is created by adding the objects remaining in the filtered List of Objects to a new binary image that represents the filtered binary seedling image.

Then, at step 224, the filtered binary seedling image created in step 222 is smoothed to remove any jagged edges resulting from any of the previous processing steps, which facilitates skeleton determination. The filtered binary seedling image created in step 222 is preferably smoothed using a binary image median filter. A preferred binary image median filter uses a kernel size of three pixels (i.e., a three-by-three square of pixels) and sets a pixel to the same value as the majority value of that pixel and its eight surrounding neighbors. For example, a pixel that is a logical ONE and having four or more surrounding neighbors that are also a logical ONE (for a total of five or more ONEs) would be set to a logical ONE, and a pixel that is a logical ONE and having three or fewer surrounding neighbors that are also a logical ONE (for a total of four or fewer ONEs) would be set to a logical ZERO. The resulting image is a smoothed, filtered binary image. The particular median filter used was adapted from R. Gonzalez and R. Woods, *Digital Image Processing*, $2^{nd}$ ed., (1992).

Next, at step 226, the smoothed, filtered binary image generated at step 224 is thinned to produce the seedling skeletons. Preferably, each object in the smoothed, filtered binary image is iteratively made thinner and thinner until the object is reduced to a number of line segments that are one pixel in width. In the broader sense, this step is a form of medial axis transformation. The particular thinning algorithm used was adapted from N. Yagi, S. Inoue, M. Hayashi, E. Nakasu, K. Mitani, M. Okui, S. Suzuki, Y. Kanatsugu, C gengo de manabu jissen gazou shori [*Learn Image Processing in C*], Ohm-sha [publisher], pp. 53–54, 1997, and is set forth in file IMGTHINN.CPP of the computer listing appendix submitted on compact disc. The result is a thinned, smoothed, filtered binary seedling image that represents the skeletons for the seedlings in the original image. Next, object labeling as discussed above is performed on the resulting thinned, smoothed, filtered binary image, which results in a List of Objects data structure for the skeletons in the thinned, smoothed, filtered binary seedling image, i.e., a List of Seedling Skeletons, which includes for each seedling skeleton: a unique object label, the bounds of that skeleton ($x_{min}$, $x_{max}$, $y_{min}$, and $y_{max}$), and the number of pixels in that skeleton. Finally, the List of Seedling Skeletons is filtered by removing all entries having fewer than a predetermined number of pixels, e.g., 15 pixels, again to eliminate any noise generated by any of the foregoing steps. This filtering action is performed in the same manner as step 222 on the List of Seedling Skeletons. At 228, program control returns to the flowchart of FIG. 10.

Referring back to FIG. 10, next at routine 230 the seedling analysis software of the present invention determines the primary axis for each seedling. At this point in the analysis, a filtered List of Seedling Skeletons has been generated; however, each seedling skeleton does not necessarily consist of a single seedling. If any of the seedlings were overlapping or very close to each other in the original scanned image, the corresponding seedling skeleton will consist of those multiple seedlings. Thus, the software preferably comprises a routine for separating multiple seedlings and more preferably comprises a routine for separating multiple seedlings using simulated annealing. Next, in general, the software determines the hypocotyl/radicle separation point for each single or separated seedling, at 232. Then, at 234, the software determines the lengths and other statistics used to determine the seed vigor index and calculates the seed vigor index. Next, the software determines a graphical overlay to be displayed with the original scanned image to show the locations of the hypocotyls and radicles of the scanned seedlings, at 236. FIG. 12 provides additional information about the routines 230, 232, and 234. Finally, at task 238, the software displays the vigor index, other statistical information, and the graphical overlay combined with the original scanned image.

Referring now to FIG. 12, additional information about the seedling analysis is shown, starting at 240. The routines of FIG. 12 are performed for each seedling skeleton listed in the filtered List of Seedling Skeletons. First, at 242, a junction graph for the skeleton is generated. In general, a junction graph is a data structure comprising a list of types of junctions in the skeleton, among other information. Each pixel in the skeleton is classified as either a terminal junction (an endpoint of the skeleton), or a connector junction (presumably where root hairs or seminal roots extend from the primary root, or where multiple seedlings overlap or meet), or not a junction. To define the junctions, a new neighborhood system was developed and used in the software of the present invention. The new neighborhood system uses a three-by-three neighborhood, and places primary emphasis on the N, S, E, and W positions and lesser emphasis on the NW, NE, SW, and SE positions of a standard three-by-three neighborhood map. More specifically, with respect to a pixel (i.e., a logical ONE) in the center of the three-by-three neighborhood, if there is a pixel (i.e., a logical ONE) at any of the N, S, E, or W positions, then they are considered to be neighbors of the center pixel. A pixel at the NE corner is only considered to be a neighbor of the center pixel if there is no pixel (i.e., no logical ONE) at either the N or the E positions. Similarly, a pixel at the NW corner is only considered to be a neighbor of the center pixel if there is no pixel (i.e., no logical ONE) at either the N or the W positions. The same applies to the SW and SE positions: pixel at either the SE corner or the SW corner is only considered to be a neighbor of the center pixel if there is no pixel (i.e., no logical ONE) at either the S or the E positions, or at either the S or the W positions, respectively. This new neighborhood system facilitates the generation of a junction graph used in primary axis generation and seedling separation. Using this new neighborhood system, a pixel is considered to be a junction if and only if the number of its neighbors is not two. If a pixel has only one neighbor under the new neighborhood system, then it is classified as a terminal junction. If a pixel has three or more neighbors under the new system, then it is classified as a connector junction. The remaining pixels (those with two neighbors under the new neighborhood system) form the "edges" of the junction graph, which are linear curve segments (portions of the skeleton) between junctions. An edge, i.e., a linear curve segment, cannot contain any junctions in this particular junction graph data structure.

The junction graph is preferably determined as follows. Within the bounding box of the seedling skeleton, all pixels belonging to the skeleton are tested for the number of neighbors. A pixel that does not have exactly two neighbors is marked as a junction, and information about where its neighbors are (e.g., NW and E) is stored. When the seedling skeleton is completely scanned (i.e., all pixels are processed), we have all the junctions (nodes) of the graph for that particular skeleton. As discussed above, an edge formed by two connected junctions is made up of all pixels connecting them. Pseudocode for finding the edges for the junction graph is as follows:

```
for each junction j
    for each neighbor n of junction j
        while current pixel is not a junction
            current pixel := next pixel in the curve segment;
        end while;
        k := junction id of the current pixel;
        if edge (j, k) has not been inserted
            insert (j, k) into junction graph;
        else
            if length of this curve segment < edge (j,k)
                remove (j, k);
                insert (j, k) with new curve segment distance;
            end if;
        end if;
    end for;
end for;
```

For each edge, the length and the angles it makes at its junctions with respect to the x-axis are computed. The angle for each junction is computed by computing the line formed from the junction and the fifth pixel in the curve segment from that junction. If there are less than five pixels in the curve segment, the angle is computed from the line formed from the junction and the other junction in the segment. The angles are used as a criterion for separating multiple seedlings. The length of each edge is calculated in pixel lengths, with one pixel length being added for pixels next to or on top of (N, S, E, or W to) the next pixel and √2 pixel lengths (approximately 1.414) being added for pixels at a diagonal to (NW, NE, SW, or SE to) the next pixel. The edge lengths are used to determine the primary axis of the skeleton, as a criterion for separating multiple seedlings, and ultimately to determine the hypocotyl length, the radicle length, and the total seedling length.

Next, at task 244, the seedling analysis software of the present invention determines whether the skeleton consists of a single seedling or multiple seedlings. This preferably makes use of information about seed coats, cotyledons, or both seed coats and cotyledons. Preferably, information about seed coats and/or cotyledons is determined using a thresholding function similar to task 220 when the binary seedling image was generated. More specific to seed coats and cotyledons, the software performs two thresholding operations on the images, one with parameters directed toward seed coats and the other with parameters directed toward cotyledons. For specific plants, e.g., lettuce, the binary seed coat image is preferably generated with pixels meeting the following criterion being in the foreground: a red intensity of between 60 and 255, a green intensity of between 0 and 255 (any green intensity), and a blue intensity of between 0 and 100. For specific plants, e.g., lettuce, the binary cotyledon image is preferably generated with pixels meeting the following criterion being in the foreground: a red intensity of between 200 and 255, a green intensity of between 200 and 255, and a blue intensity of between 0 and 200. These two binary images are then labeled using object labeling to generate a List of Objects data structure for each binary image, which are then filtered using the filter routine 222 to filter out objects less than a certain pixel size, e.g., less than 10 pixels. The resulting binary seed coat image and binary cotyledon image have objects corresponding to seed coat objects and cotyledon objects, respectively, in the original scanned image. These seed coat objects and cotyledon images can be used to determine how many seedlings are present in each skeleton.

Based on the assumption that there is one cotyledon object (actually a pair of cotyledons, which appear as a single cotyledon object in the binary cotyledon image) and exactly one seed coat object for each seedling, the number of cotyledons/seed coats indicates the number of seedlings on the skeleton. However, in some seedlings only a cotyledon object is present (e.g., because the seed coat fell away from the cotyledon), in some seedlings only a seed coat is present (e.g., because the cotyledon has not emerged or remains covered by the seed coat), and in some seedlings both a seed coat and a cotyledon are present (e.g., because the cotyledon has partially emerged from the seed coat). Accordingly, sometimes a seed coat object and a cotyledon object are merged into a single object to indicate a cotyledon for a single seedling if they are close enough (e.g., within 10 pixels). In the present implementation of the present invention, a List of Objects is created for each of the cotyledon binary image and the seed coat binary image. Not all the objects in the List of Objects representing seed coats, cotyledons, or seed coats and cotyledons are associated with the particular skeleton being analyzed. Bounding boxes expanded by a number of pixels, e.g., eight pixels, in all four directions (e.g., $x_{min}-8$, $x_{max}+8$, $y_{min}-8$, and $y_{max}+8$) are used to associate the seed coat/cotyledon objects with each skeleton. That is, only seed coat/cotyledon objects in the Lists of Objects located completely within or partially within the expanded bounding box of that skeleton are associated with that skeleton.

Next, for each seed coat/cotyledon object in the Lists of Objects for that skeleton, the software determines the junction closest to the object. More specifically, for each cotyledon object, the junction closest to the center of the object is found (such a junction is called a cotyledon junction), where the center is defined as the center of the bounding box for the object. For each seed coat object, the junction closest to the center of the object that is within 10 pixels is found (such a junction is called a seed coat junction); if no such junction exists, then the seed coat object is discarded from further processing. For each seed coat junction, the existence of a nearby (e.g., within 10 pixels) cotyledon junction is checked. If there is a nearby cotyledon junction, the seed coat junction is discarded. This has the effect of marking a seed coat/cotyledon object as one cotyledon object when the cotyledon is only partially visible from the seed coat. After the above task is completed, the number of cotyledon junctions and the number of remaining seed coat junctions are added to represent the number of seedlings present in the seedling blob. There can be four cases: (1) the sum is zero, (2) the number of cotyledon junctions is one, but the number of seed coat junctions is zero, (3) the number of cotyledon junctions is zero, but the number of seed coat junctions is one, (4) the sum is two or greater. Case (1) represents the case where the seedling is missing a seed coat/cotyledon object, or the size/color of the object was rare that the thresholding did not pick it up. In this case it is assumed that there exists exactly one seedling in the seedling skeleton. Case (2) represents the case where the cotyledon is not covered by a seed coat. In this case, exactly one seedling is assumed in the seedling skeleton. Case (3) represents the case where the cotyledon is entirely covered by a seed coat. It is assumed that the seedling skeleton contains exactly one seedling in this case. Case (4) represents a case where there are multiple seedlings in the seedling skeleton.

The following annotated pseudocode presents additional information on the determination of start junctions in each seedling skeleton (which is determined by task 226), found in file SEEDANLZ.CPP of the computer listing appendix submitted on compact disc:

coatimg contains the binary image of seed coats, which was obtained by thresholding the original color image of the blotter and seedlings.

minx is the minimum x coordinate of the bounding box of the seedling skeleton.

maxx is the maximum x coordinate of the bounding box of the seedling skeleton.

miny is the minimum y coordinate of the bounding box of the seedling skeleton.

maxy is the maximum y coordinate of the bounding box of the seedling skeleton.

cotblobimg is cotimg cropped by the box (minx−8, miny−8, maxx+8, maxy+8).

coatblobimg is coating cropped by the box (minx−8, miny−8, maxx+8, maxy+8).

cotinfo is the List of Objects extracted from cotblobimg that are larger than or equal to c_mincotsize in terms of the number of pixels.

coatinfo is the List of Objects extracted from coatblobimg that are larger than or equal to c_mincoatsize in terms of the number of pixels.

The software examines each seed coat to determine if that seed coat should be associated with a junction:

```
for each object in coatinfo
    (coatx, coaty) = center of the bounding box for the
object;
        the ID of the junction in coatinfo that is closest to
    (coatx, coaty) and within 10 pixels distance from (coatx, coaty)
    is added to coatindx;
    end for;
```

The software then examines each cotyledon to determine its associated junction:

```
for each object in cotinfo
    (cotx, coty) = center of the bounding box for the
object;
        the ID of the junction that is closest to (cotx, coty)
    is added to cotindx;
    end for;
```

The software then reconciles the junctions associated with seed coats and/or cotyledons:

```
for each junction ID in cotindx
    cotjunction = junction identified by the junction ID in
cotindx;
    for each junction ID in coatindx
        coatjunction = junction identified by the junction
ID in coatindx;
        if the distance between cotjunction and
coatjunction is less than 10
            the ID of the coatjunction is removed from
coatindx;
        end if;
    end for,
end for;
```

After the above steps, cotindx contains the junction ID's of the detected cotyledons, and coatindx contains the junction ID's of the detected seed coats. When a seed coat junction is close to a cotyledon junction, e.g., within 10 pixels, the seed coat junction is disregarded (i.e., absorbed into the cotyledon junction). The number of detected cotyledons and seed coats in the seedling skeleton can then be separated into the following four cases:

Case 1: If no cotyledon or seed coat was detected, assume the seedling skeleton contains exactly one seedling.

Case 2: If one cotyledon was detected but no seed coat was detected, assume the seedling skeleton contains exactly one seedling.

Case 3: If one seed coat was detected but no cotyledon was detected, assume the seedling skeleton contains exactly one seedling.

Case 4: If the lists of seed coat junctions and cotyledon junctions for this seedling skeleton does not fit either case 1, case 2, or 3, (which can be checked by adding the number of ID's in cotindx and the number of ID's in coatindx, and see if the sum is greater than one) then the software assumes that the seedling skeleton contains multiple seedlings (more specifically, the number of seedlings is determined to be the sum of the number of D's in cotindx and the number of ID's in coatindx).

The software now has determined enough about the seedling skeleton to determine the result of the branch task at 244, whether the seedling skeleton represents a single seedling or multiple seedlings. On the one hand, if the seedling skeleton was determined to be either Case 1, 2, or 3, then the skeleton is determined to be comprised of only a single seedling. Consequently, the response to the question "Single Seedling?" at branch task 244 in FIG. 12 is "Yes" and the code branches to task 246 to analyze the skeleton as a single seedling. On the other hand, if the seedling skeleton was determined to be Case 4, then that skeleton is determined to be comprised of multiple seedlings. Consequently, the response to the question "Single Seedling?" at branch task 244 in FIG. 12 is "No" and the code branches to task 248 to analyze the skeleton as a multiple seedling. In either case, the next step is to determine the "primary axis" of each seedling, e., the path from the start junction down to the terminal junction of the primary (longest) root of the radicle. A single routine could be used to determine the primary axis of skeletons representing single seedlings and skeletons representing multiple seedlings. However, the branch at task 244 allows the primary path detection routine for single seedlings to be optimized.

Thus, if the skeleton represents a single seedling, the routine at 246 determines the primary axis of that single seedling. In the single seedling case, there are three subcases discussed earlier: (I) there are no cotyledon nor seed coat junctions, (2) there is one cotyledon junction but no seed coat junction, (3) there is one seed coat junction but no cotyledon junction. For Case 1, the shortest path is computed for each terminal junction to every other terminal junction to detect the primary axis of the seedling. The longest path is considered as the primary path. Since there is no information about which end junction of the primary path is the start junction (i.e., the junction that belongs to the cotyledon), whichever end junction that appears higher in the image (i.e., has a lower y coordinate, assuming the first, top scanline of the screen is y=0, the next scanline is y=1, etc.) is considered to be the start junction. For Case 2, the shortest path is computed from the cotyledon junction to every other junction and the longest path is considered to be the primary axis. The start junction is the cotyledon junction. For Case 3, the primary axis is found by computing the shortest path from the seed coat junction to every other terminal junction. The longest path is considered to be the primary path. The start junction is the seed coat junction.

This is based on the assumption that the seedling starts from a cotyledon and extends down to the tip of a single primary root. In the alternative, for plants having a plurality of primary, secondary or seminal roots, the primary path routines of the present invention will need to determine a plurality of primary paths, e.g., by selecting the n longer to shortest-paths or by determining a statistical value from all the calculated shortest-paths and selecting a number of longer shortest-paths above a determined value based on the statistical value of the shortest-paths. Referring back to the present implementation, given that the start junction is constrained as the cotyledon, the end point is the terminal junction farthest (in terms of path length) from the start junction. For the start junction and all the other terminal junctions (i.e., candidates for the end junction), there can be many, often infinite, ways to traverse the edges (paths). Thus, for each start junction/terminal junction pair, the shortest path is taken. Each junction has a unique identifier associated therewith. Each path is represented by a series of junction identifiers. To find the shortest path from one node to every other node in a junction graph, a routine based on an algorithm presented in E. W. Dijkstra, "A Note on Two Problems in Connection with Graphs," *Numerische Math*, (1): 269–271 (1959) was used. Preferably, the longest of the shortest-paths is taken as the primary path, i.e., the primary axis of the seedling. The disadvantage of this implementation is that the primary axis for the seedling will not be correct when the seedling makes a large loop, because the shortest path will exclude the length of the loop. In the alternative, the software can detect such loops and correct the shortest path accordingly.

Having determined the primary path, i.e., the primary axis, of the seedling skeleton, the software next determines the hypocotyl/radicle separation point for the seedling skeleton, at 232 (FIG. 12). The hypocotyl/radicle separation point is assumed to be located at the upper most point in the seedling where the root hairs (or secondary roots) extend from the seedling. In terms of the junction graph of the seedling skeleton, the hypocotyl/radicle separation point is assumed to be located at the junction closest to the start junction (cotyledon terminal junction) that does not result in a hypocotyl:radicle ratio (length of hypocotyl divided by length of radicle) that is too low, preferably set at 0.15. Thus, the routine at 232 selects a candidate junction, i.e., the junction in the primary path closest to the start junction, and calculates the lengths of the hypocotyl and radicle based on the assumption that that junction is the hypocotyl/radicle separation point (using the edge lengths in the junction graph). If the ratio of hypocotyl length to radicle length is or greater, then that junction is the separation point. If the ratio of hypocotyl length to radicle length is less than the value, e.g., 0.15, the software selects the next junction in the primary path of the skeleton and calculates the lengths of the hypocotyl and radicle based on the assumption that that junction is the hypocotyl/radicle separation point (using the edge lengths in the junction graph). Again, the ratio is determined and compared to the test value, e.g., 0.15, and either results in the determination of a proper separation point or the process repeats itself with the next junction in the primary path of the skeleton until a proper separation point is found (i.e., one that causes the length ratio to pass the test). Once a proper separation point is determined, the lengths of the hypocotyl and radicle are added together to calculate the total length of the seedling skeleton, as indicated at 250, and then the program at 252 either branches back up to perform routine 230 (FIG. 12) again for the next seedling skeleton or returns to the code of FIG. 11.

Referring back to task 248, if the seedling skeleton was determined to comprise multiple seedlings at task 244, the software must account for the multiple seedling nature of that skeleton. Preferably, the software performs seedling separation, i.e., separates the multiple seedlings into a plurality of single seedlings, which can then be analyzed to determine their separation points, hypocotyl lengths, radicle lengths, and/or total lengths, etc. Preferably, the separation of seedlings in skeletons representing multiple seedlings is done by a routine comprising simulated annealing. A routine based in part on a separation algorithm by H. Ni and S. Gunasekaran, "A Computer Vision Method for Determining Length of Cheese Shreds," *Artificial Intelligence Review*, 12: 27–37 (1998) and a simulated annealing routine by S. Kirkpatrick, C. D. Gelatt, M. P. Vecchi, "Optimization by simulated annealing," *Science* 200(4598): 671–680 (1983) was used.

Recall that from the routine at 244 (or Case 4 in the preceding pseudocode), the software has determined the number and location of the start junction (cotyledon or seed coat junction) for each of the multiple seedlings in the seedling skeleton. The software must next determine the primary path for each start junction, i.e., the primary path for each of the multiple seedlings. This is done by determining a number of possible paths and evaluating them. Because each start junction is connected to one or more other junctions, one of the other junctions can be selected and considered an extension of the seedling. By choosing another junction, then another, a sequence of junctions can be chosen, which in turn defines a sequence of linear curve segments (edges). Any sequence of linear curve segments created this way can be considered a candidate for the structure of the seedling. Since this routine is directed at a junction graph representing multiple seedlings, such a sequence of linear curve segments is created for each start junction, i.e., for each seedling. Each possible combination of all seedling structures (a candidate path for each and every start junction) is called a "configuration." Then, the seedling separation routine can evaluate each configuration of seedling paths and select the configuration determined to be the configuration that has correctly identified the paths of each seedling. Preferably, the seedling separation procedure is implemented as an energy minimization routine, with every configuration having a calculated energy value associated therewith, and the configuration having the lowest energy (or in the alternative the highest energy) is considered to be the correct configuration. That is, the "energy" is defined as a function of the configuration in such a way that a more desirable configuration has lower energy (or higher energy) than a less desirable configuration. The proper configuration is identified by an energy that is minimal as compared to all other configurations. In implementing this energy function and analysis, it is possible to create every possible configuration, compute the energy for each and every configuration, and search for the configuration that minimizes the energy. This brute force method can be accomplished in a reasonable computation time if the number of junctions and edges is relatively small, and/or if the processing capability of the computer unit 14 is relatively fast. However, the routine does not scale very well, because the search space is exponential, i.e., as the number of junctions and edges increases, the computation time to search the best configuration increases exponentially. Thus, preferably, a stochastic minimization method is used. More preferably, simulated annealing is used. Simulated annealing does not guarantee convergence to a global minimum (i.e., the most desirable configuration of all configurations), but simulated annealing does reach a very low energy configuration with high probability, i.e., simulated annealing identifies a seedling path configuration that very likely contains a correct or very close to being a correct set of paths for each seedling.

The preferred energy function used for this procedure is set forth as follows:

$$SE(s_i) = w_{angle} \sum_{t \in T_{s_i}} \text{angle}(t)^2 + w_{separation} I_{separation}(s_i)$$

$$CE(S, U) = \sum_{s_i \in S} SE(s_i) + w_{unused} \sum_{e \in U} \text{length}(e)$$

where SE is the energy for seedling $s_i$, $Ts_i$, is the set of pair of junctions $s_i$ on which a turn was made (ignoring turns on edges that are too short), $I_{separation}$ is an indicator function that evaluates to 1 when a hypocotyl/radicle separation exists for $s_i$ and 0 otherwise, S is the set of all seedlings in the seedling blob, U is the set of unused edges (i.e., edges not occupied by any seedlings), CE is the energy for a configuration with S and U, and $W_{angle}$, $W_{separation}$, and $W_{unused}$ are constants. It was experimentally found that the following parameters yield satisfactory results: maximum number of annealing loop iterations=50,000, $W_{angle}$=200, $W_{separation}$=200, $w_{unused}$=10. Other values and weights may provide satisfactory results and these values and weights (and other constants used herein) are preferably modifiable by the user to take into account user preference, analysis of different species, etc.

The simulated annealing routine starts with an initial configuration, preferably just the start junction for each seedling. A random change to the configuration is proposed, preferably a junction is added to one of the seedling paths, and the change is accepted immediately and that junction becomes part of the seedling path if the proposed configuration has a lower energy than the current configuration does. If the proposed configuration has a higher energy than the current configuration, then the proposed configuration has a chance of being accepted or rejected. In the case where the proposal is rejected, then the current configuration remains unchanged. This process of configuration proposal, energy computation, and acceptance/rejection is repeatedly performed. After a number of iterations, a configuration in which the energy is very low should be reached.

Thus, the ultimate goal of simulated annealing is to achieve a configuration that minimizes the energy in an attempt to find the most desirable configuration, without having to evaluate every possible configuration for that seedling skeleton. The formulation for the energy is a primary determining factor of desirable configurations in a problem setting. The "temperature" controls the probability that a change to the current configuration should be accepted. When the temperature is high, the probability of going to a higher-energy configuration can occur as frequently as going to a lower-energy ! configuration (thus very random); while at a low temperature, changes occur only if it decreases the energy (always downhill).

More specific to the present implementation of the present invention, to define the seedling configuration energy, the following energy determination rules and heuristics are used.

Rules:
(1) A primary axis is a polyline (i.e., no branching is allowed).
(2) A seedling cannot reuse one of its edges.
(3) Multiple seedlings can share the same edge in the junction graph.
(4) Edges can be left unused.

Heuristics:
(1) Primary axes do not make unnaturally sharp turns.
(2) Edges in the junction graph should be used as much as possible.
(3) It is desirable that all primary axes have a hypocotyl/radicle separation.

Each seedling has a start junction and an end junction, which is the current end of the path for that particular seedling in the skeleton. Each proposed path has a fixed start junction and a varying end junction. Recall that the initial configuration preferably consists of only the start junctions (cotyledon terminal junctions) for the skeleton. Consequently, the start junctions initially are also the end junctions for each seedling. The following loop is performed to iteratively update the proposed seedling configuration:

(a) Among all seedlings in the skeleton, randomly choose one seedling to update.
(b) Determine the neighbor junctions of the end junction using the junction graph for that seedling.
(c) Randomly choose a neighbor junction for that end junction.

(d) If the chosen junction is already in the edge set for the seedling, then attempt to remove the junction from the seedling.

(e) If the chosen junction is anything else, then attempt to add the junction to the seedling.

(f) Decrease temperature and repeat until the maximum number of iterations is reached.

Because junction computation is done at the pixel level, there may be junctions that are close together, which can cause a problem in turn angle calculation. For example, the angle of a turn created by three pixels, a pixel and its N and SE neighbors would be 135°; however, the seedling might not have made any significant turn at all at that point. To avoid this potential problem, the turns of edges that are not sufficiently long are ignored. In this implementation, preferably the turns on edges less than 10 pixels long are ignored.

By the time the maximum number of iterations of the configuration update loop have been performed, the configuration should have the correct primary path for each seedling. A maximum number of iterations of 50,000 was found to yield satisfactory results. Each of the primary paths determined by the routine at task 248 is then processed by software routines 232 and 250 to determine the hypocotyl length, radicle length, and total length.

With that introduction, the following annotated pseudocode describes the seedling separation software, i.e., function SeparateSeedlings in file SEEDANLZ.CPP of the computer listing appendix submitted on compact disc, in further detail:

Data Structures paths is a list of primary paths for all seedlings. Because each primary path is represented by a list of junction identifiers, paths is a list of lists. Initially the path for each seedling contains only the start junction for that seedling.

endAngle is a list whose i'th element is a list of the angles formed by seedling i. Angles of edges are preferably measured with respect to the x-axis (with respect to the horizontal), so the angles between edges are calculated by subtracting the angle of edge from the angle of another. Thus, two parallel edges will have an angle of 0° between them. This data structure does not store angles formed by turning onto edges that are shorter than minEdgeLength.

pathlength is a list whose i'th element represents the total length of the present path of seedling i.

RHseparation is a list whose i'th element represents the junction identifier of the hypocotyl/radicle separation mark for seedling i.

RHseparation2 is a list whose i'th element represents the junction identifier of the hypocotyl/radicle separation end. There are several differences between the junctions identified by RHseparation and RHseparation2. The junction identified by RHseparation is the first junction in a seedling's path that is at least 20 pixels away from the start junction. The junction identified by RHseparation2 is the first junction in a seedling's path encountered after RHseparation that is at least 20 pixels away from RHseparation. If the first junction from is closer than 20 pixels from RHseparation, the software looks at consecutive junctions until the first junction that is at least 20 pixels from RHseparation is found and assigns that junction to RHseparation2. Unless and until the software has determined both the RHseparation and RHseparation2, the software does not deem a seedling as having a hypocotyl/radicle separation point, which is taken into account in the energy function.

separationlen is the distance in pixels between the junctions identified by RHseparation and RHseparation2.

edgeOccupation is a list whose i'th element is a set of edges that are occupied by the i'th seedling.

Computing Energy for Initial Configuration

The initial energy is set to the sum of the unused edge penalties for all edges, since no edges are occupied by any seedlings, and the penalty for not having determined any hypocotyl/radicle separation points yet:

```
energy = 0;
for each edge in junction graph
    energy = energy + unusedW * edge_length;
end for;
energy = energy + separationW * number_of_seedlings;
``` where unusedW is the weight (scalar) for unused edges, edge_length is the length of each respective edge, separations is the weight for each seedling for which the hypocotyl/radicle separation point has not been determined, and number of seedlings is the number of seedlings in the skeleton being analyzed.

Simulated Annealing Loop

With this initial set-up, the following loop is performed loopmax number of times:

seedID is set to the ID of the seedling that is randomly chosen to be updated.

endjunc is set to current end junction of the seedling seedID.

neighbors is the set of ID's all neighboring junctions to endjunc. The neighbors set includes the previous junction in the path, i.e., the junction in the path before endjunc.

choice is the ID of a junction randomly chosen from neighbors.

changeAngle is set to false

The particular junction randomly chosen to be choice greatly affects the execution of the code, in the sense that the junction chosen by choice can either extend the seedling path by one more junction or shorten the path by one junction. A different routine is executed if the previous junction in the path is randomly chosen as compared to whether a subsequent junction is chosen.

1. Choice is the Same Junction as the Preceding Junction to endjunc

If choice is the same junction as the preceding junction to endjunc, i.e., the software is backtracking back up the seedling path (shortening the path by one junction), the software determines the energy benefit or energy penalty of removing the last junction and edge from the path for the current seedling. Thus, the software computes the change in configuration energy (deltaEnergy) if the last junction/edge

```
deltaEnergy = 0;
if removing the junction/edge results in hypocotyl/radicle
separation to be removed, i.e., the point being removed is
RHseparation2 meaning that removing this junction causes a
hypocotyl/radicle separation point to be lost, for which there
is a penalty
```

-continued

```
        deltaEnergy = deltaEnergy + separationW;
    end if;
```

If removing this junction causes an angle to be changed and/or removed, there may be an energy change in response thereto:

```
        if edge_length > minEdgeLength, i.e., if the length of the
    edge being removed is less than a minimum edge length (e.g., 10
    pixels), which allows us to preferably ignore the small edge
    because it might otherwise lead to erroneous angles being used
    in the energy function;
        if there are more than one element in endAngle for this
    seedling
            angle = angle formed by endjunc, choice, and the
    preceding junction to choice;
            deltaEnergy = deltaEnergy - angleW * angle^2;
        end if;
        set changeAngle to true to indicate that removing this
    edge erases an angle;
    end if;
```

If removing this junction causes an edge to become an unused edge, i.e., this seedling is no longer using the edge and no other seedling is currently using this edge, there may be an energy change in response thereto:

```
    if the edge is no longer occupied after removal (no
    seedling contains the edge in their primary paths)
        deltaEnergy = deltaEnergy + unusedW * edge_length;
    end if;
```

After determining the change in energy by the proposed removal of this junction, the change in energy is tested to determine if removing this junction was either (1) a change for the better, i.e., the change in energy was negative (deltaenergy<0), or (2) there was a positive increase in energy (removing this junction was a change for the worse). There is a chance that the change will be made anyway if the condition (exp(−deltaEnergy/(temperatureconst*temperature))>random_number_between (0,1)) is satisfied, despite the fact that removing this junction would cause an increase in energy (which allows the routine to find the lowest energy configuration and not merely a local energy minimum). Such a random change is likely to occur when the temperature is high. The probability of this last expression being true (for any value of deltaEnergy) decreases with each iteration of the loop (because temperature decreases with every loop). If either of these conditions are true, the junction and edge are removed from the seedling path, the energy for the configuration is updated, the length of the seedling path is adjusted, and possibly an angle and/or the separation points, etc. are removed:

```
    if deltaEnergy < 0 or exp(-deltaEnergy / (temperatureConst
    * temperature)) > random_number_between(0,1)
        mark that choice no longer occupies the edge;
        remove choice from the primary axis of the seedling;
        if changeAngle is true
            remove the last element from endAngle;
        end if;
```

-continued

```
        if choice is the hypocotyl/radicle separation mark
    (RHseparation) for the current seedling
            remove separation mark from the seedling;
        end if;
        if choice is the separation end point (RHseparation2)
    for the current seedling
            remove separation end point from the seedling;
        end if;
        subtract the edge length from the seedling path length;
        energy = energy + deltaEnergy;
    end if;
```

2. Choice is Any Other Junction than the Preceding Junction to endjunc

If choice is any other junction than the preceding junction to endjunc, i.e., the software is adding a new junction to the seedling path (increasing the path by one junction), the software determines the energy benefit or energy penalty of adding this new junction and edge to the path for the current seedling. Thus, the software computes the change in configuration energy (deltaEnergy) if this new junction/edge were to be added to the primary path of that seedling:

deltaEnergy=0

The software computes the change in configuration energy (deltaEnergy) if the edge were to be added to the primary path:

```
    if the edge is not already occupied by any other seedling
        deltaEnergy = deltaEnergy - unusedW * edgeLength;
    end if;
```

Next, the software computes the change in configuration energy (deltaEnergy) associated with any identification of hypocotyl/radicle separation points or end points by the addition of this junction:

```
    if the current seedling does not already have a
    hypocotyl/radicle separation mark (RHseparation)
        if choice has more than 2 neighbors and the current
    seedling length is greater than 20
            newseparation = true;
        end if;
        elseif the current seedling has a separation mark (has
    RHseparation) but the separation is not complete (does not have
    RHseparation2)
        and if the length from the mark to choice is greater than 20,
    i.e., choice can be RHseparation2
            deltaEnergy = deltaEnergy - separationW;
            separationcomplete = true;
        endif
```

Next, the software computes the change in configuration energy (deltaEnergy) associated with any change in angle caused by the addition of this junction:

```
    if edge_length > minEdgeLength i.e., if the length of the
    edge being removed is less than a minimum edge length (e.g., 10
    pixels), which allows us to preferably ignore the small edge
    because it might otherwise lead to erroneous angles being used
    in the energy function;
        angle = angle formed by preceding junction to end junc,
    endjunc, choice;
        deltaEnergy += angleW * angle^2;
```

-continued

```
        set changeAngle to true to indicate adding this edge
        will create an angle;
        endif;
```

After determining the change in energy by the proposed addition of this junction, the change in energy is tested to determine if adding this junction to the path of this seedling was either (1) a change for the better, i.e., the change in energy was negative (deltaEnergy<0), or (2) there was a positive increase in energy (adding this junction was a change for the worse). There is a chance that the change will be made anyway if the condition (exp (−deltaEnergy/(temperatureconst* temperature))>random_number_between (0, 1)) is satisfied, despite the fact that adding this junction would cause an increase in energy (which allows the routine to find the lowest energy configuration and not merely a local energy minimum). Such a random change is likely to occur when the temperature is high. The probability of this last expression being true (for any value of deltaEnergy) decreases with each iteration of the loop (because temperature decreases with every loop). If either of these conditions are true, the junction and edge are added to the seedling path, the energy for the configuration is updated, the length of the seedling path is adjusted, and possibly an angle and/or the separation points, etc. are added:

```
        if deltaEnergy < 0 or exp(-deltaEnergy / (temperatureConst
    * temperature)) > random_number_between(0,1)
            mark that this seedling has occupied by this seedling;
            add choice to the primary path of the current seedling;
            if changeAngle is true
                add angle to endAngle;
            end if;
            add the edge length to the seedling path length;
            if newseparation is true
                mark choice has the hypocotyl/radicle separation
    point (RHseparation) for the current seedling;
                set separation length of this seedling to the path
    length of this seedling;
            end if;
            if separationcomplete is true
                mark separation end point (RHseparation2) as
    choice;
            end if;
            energy = energy + deltaEnergy;
        end if;
```

Whatever happens in each iteration of the simulated annealing loop, the temperature is decreased to change the probability of accepting a proposal to change from the current configuration to a configuration having higher energy:

temperature=0.99*temperature;
End

The result of the foregoing routine is a list of primary paths, one primary path for each of the seedlings separated, i.e., separately identified, by that routine. Each of the primary paths determined by the routine at task 248 is then processed by software routines 232 and 250 to determine the hypocotyl length, radicle length, and total length.

After the last seedling skeleton in the filtered List of Seedling Skeletons has been ed by the routine of FIG. 12 to determine the hypocotyl length, radicle length, and total length, program control returns to task 234 to determine the seedling statistics and the vigor index for these this particular scanned blotter of seedlings. The vigor index is defined as follows:

$$\text{vigor}=w_G*\text{growth}+w_U*\text{uniformity},$$

$$\text{growth}=\min(w_h*\overline{l_h}+w_r*\overline{l_r},1000),$$

$$\text{uniformity}=\max(1000-(w_{h'}*s_h+w_{r'}*s_r+w_{total}*s_{total}+w_{r/h}*s_{r/h})-w_d*\text{numdead},0)$$

where $\overline{l_h}$ and $\overline{l_r}$ are the sample averages (sample means) of the hypocotyl length and the radicle length, respectively, $s_h$, $s_r$, $s_{total}$, and $s^{r/h}$ are the sample standard deviations of the hypocotyl length, radicle length, total length, and the ratio of the hypocotyl and radicle lengths, and the w's represent associated weights with the parameters being multiplied.

The present implementation of the present invention uses the following constants: $w_G=0.7$, $w_U=0.3$, $w_h=2.5$, $w_r=5.0$, $w_{h'}=0.75$, $w_{r'}=0.5$, $w_{total}=2.5$, and $w_{r/h}=50$. Other weights will provide satisfactory results and these weights (and other constants used herein) are preferably modifiable by the user to take into account user preference, analysis of different species, etc.

The vigor index is divided into growth and uniformity parameters because seed analysts examine these to determine seed vigor. Each component has a minimum value of 0 and a maximum value of 1000. The vigor index ranges from 0 to 1000 as it is a weighted average of the components, where weights range from 0 to 1 and sum to 1. Weights can be adjusted to favor either growth or uniformity. Ideally, seedlings should be long and have uniform length. Since uniformity is a component of the vigor index, a uniformly dead sample can have a uniformity of 1000, and thus obtains a relatively high vigor index. This is not desirable. Thus, the software uses a penalty term in uniformity for dead seeds (seeds that were removed from further processing by task 216) so that when a sample has all dead seeds, the uniformity is calculated as 0 instead of 1000.

Next, a graphical overlay is determined from the seedling skeleton paths, at task 236, and displayed along with the vigor index and other parameters at task 238. The graphical overlay is best explained with reference to FIG. 9, which shows an image of the original scan of seedlings in the "Seedling Image" window, with red overlaid skeletons indicating where the software of the present invention determined the seedling hypocotyls to be and green skeletons indicating where the software of the present invention determined the seedling radicles to be. The overlay can be one pixel or several pixels in width. The point between the red and green overlays indicates the determined hypocotyl/radicle separation point for each seedling.

Also in the display of FIG. 9, there is a region for display of "Individual Measurements" for a particular seedling. If a user places the active point of a pointing device, e.g., places the active point of a cursor of a mouse 20, over one of the images of the one of the seedlings in the Seedling Image window, and actuates a switch of the pointing device, e.g., presses a button on the mouse 20, the software of the present invention displays in the "Individual Measurements" region the hypocotyl length, the radicle length, the total length, and the ratio for that particular seedling.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the present implementation of the present invention has been optimized for lettuce plants and should function with little or no modification on other plants with similar seedlings, e.g., certain impatiens or soybeans. Seedlings of other plants can be analyzed using the teachings and benefits of the present invention with certain modifications to the code described herein. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. A method for automatically analyzing a plurality of seedlings germinated from a plurality of seeds, comprising:
   capturing a digital image of each of the plurality of seedlings;
   identifying each of the plurality of seedlings in the captured digital image;
   determining a primary path of each of the plurality of seedlings;
   determining at least one value from the primary path of each of the plurality of seedlings including determining a value corresponding to an overall length of each of the plurality of seedlings from the primary path of each of the plurality of seedlings; and
   determining a seed vigor index from at least the values determined from the primary path of each of the plurality of seedlings including determining a seed vigor index from at least the value corresponding to the overall length of each of the plurality of seedlings.

2. A method of automatically analyzing a plurality of seedlings germinated from a plurality of seeds, comprising:
   capturing a digital image of each of the plurality of seedlings;
   identifying each of the plurality of seedlings in the captured digital image;
   determining a primary path of each of the plurality of seedlings;
   determining a separation point between the hypocotyl and the radicle of each of the plurality of seedlings;
   determining at least one value from the primary path of each of the plurality of seedlings including determining a hypocotyl length value corresponding to the length of the hypocotyl of each of the plurality of seedlings and a radicle length value corresponding to the length of the radicle of each of the plurality of seedlings; and
   determining a seed vigor index from at least the values determined from the primary path of each of the plurality of seedlings including determining a seed vigor index from at least the hypocotyl length value and the radicle length value.

3. A method for automatically analyzing a plurality of seedlings germinated from a plurality of seeds, comprising:
   capturing a digital image of each of the plurality of seedlings;
   identifying each of the plurality of seedlings in the captured digital image;
   determining a primary path of each of the plurality of seedlings including determining for each of the plurality of seedlings a locus of pixels, the locus of pixels corresponding to the primary path of the respective seedling and the locus of pixels being one pixel in width;
   determining at least one value from the primary path of each of the plurality of seedlings; and
   determining a seed vigor index from at least the values determined from the primary path of each of the plurality of seedlings.

4. A method for automatically analyzing a plurality of seedlings germinated from a plurality of seeds, comprising:
   capturing a digital image of each of the plurality of seedlings;
   identifying each of the plurality of seedlings in the captured digital image:
   separately identifying a plurality of overlapped seedlings in the digital image of at least one of the plurality of seedlings;
   determining a primary path of the at least one seedling including determining a primary path for each of the separately identified overlapped seedlings;
   determining at least one value from the primary path of the at least one seedling including determining from the primary path for each of the separately identified overlapped seedlings a length value corresponding to an overall length of that separately identified overlapped seedling; and
   determining a seed vigor index from at least the values determined from the primary path of the at least one seedling including determining a seed vigor index from at least the length values.

5. The method of claim 4 wherein separately identifying a plurality of overlapped seedlings in the digital image of at least one seedling comprises evaluating an energy function.

6. The method of claim 4 wherein separately identifying a plurality of overlapped seedlings in the digital image of at least one seedling comprises evaluating an energy function based on proposed configurations of at least partial primary paths of overlapped seedlings.

7. The method of claim 4 wherein separately identifying a plurality of overlapped seedlings in the digital image of at least one seedling comprises evaluating an energy function based on proposed configurations of at least partial primary paths of overlapped seedlings using the following heuristics: primary paths do not make unnaturally sharp turns and seedling edges should be used as much as possible.

8. The method of claim 4 wherein separately identifying a plurality of overlapped seedlings in the digital image of at least one seedling comprises evaluating an energy function based on proposed configurations of at least partial primary paths of overlapped seedlings using the following heuristics: primary paths should not make unnaturally sharp turns, seedling edges should be used as much as possible, and all primary axes should have a separation point between the hypocotyl and the radicle.

9. A method for automatically analyzing a plurality of seedlings germinated from a plurality of seeds, comprising:
   capturing a digital image of each of the plurality of seedling:
   identifying each of the plurality of seedlings in the captured digital image;
   separately identifying a plurality of overlapped seedlings in the digital image of at least one of the plurality of seedlings;
   determining a primary path of the at least one seedling including determining a primary path for each of the separately identified overlapped seedlings;
   determining at least one value from the primary path of the at least one seedling including determining from the primary path for each of the separately identified overlapped seedlings a length value corresponding to the length of at least one of the hypocotyl of that separately identified overlapped seedling and the radicle of that separately identified overlapped seedling; and determining a seed vigor index from at least the values determined from the primary path of the at least one seedling including the step of determining a seed vigor index from at least the length values.

10. The method of claim 9 wherein separately identifying a plurality of overlapped seedlings in the digital image of at least one seedling comprises evaluating an energy function.

11. The method of claim 9 wherein separately identifying a plurality of overlapped seedlings in the digital image of at least one seedling comprises evaluating an energy function based on proposed configurations of at least partial primary paths of overlapped seedlings.

12. The method of claim 9 wherein separately identifying a plurality of overlapped seedlings in the digital image of at least one seedling comprises evaluating an energy function based on proposed configurations of at least partial primary paths of overlapped seedlings using the following heuristics: primary paths do not make unnaturally sharp turns and seedling edges should be used as much as possible.

13. The method of claim 9 wherein separately identifying a plurality of overlapped seedlings in the digital image of at least one seedling comprises evaluating an energy function based on proposed configurations of at least partial primary paths of overlapped seedlings using the following heuristics: primary paths should not make unnaturally sharp turns, seedling edges should be used as much as possible, and all primary axes should have a separation point between the hypocotyl and the radicle.

14. A method for automatically analyzing a plurality of seedlings germinated from a plurality of seeds, comprising:
   capturing a digital image of each of the plurality of seedlings;
   identifying each of the plurality of seedlings in the captured digital image;
   separately identifying a plurality of overlapped seedlings in the digital image of at least one of the plurality of seedlings;
   determining a primary path of the at least one seedling comprises including determining a primary path for each of the separately identified overlapped seedlings;
   determining at least one value from the primary path of the at least one seedling including determining from the primary path for each of the separately identified overlapped seedlings a hypocotyl length value corresponding to the length of the hypocotyl of that separately identified overlapped seedling and a radicle length value corresponding to the length of the radicle of that separately identified overlapped seedling; and
   determining a seed vigor index from at least the values determined from the primary path of each of the plurality of seedlings including determining a seed vigor index from at least the plurality of hypocotyl length values and at least the plurality of radicle length values.

15. The method of claim 14 wherein separately identifying a plurality of overlapped seedlings in the digital image of at least one seedling comprises evaluating an energy function.

16. The method of claim 14 wherein separately identifying a plurality of overlapped seedlings in the digital image of at least one seedling comprises evaluating an energy function based on proposed configurations of at least partial primary paths of overlapped seedlings.

17. The method of claim 14 wherein separately identifying a plurality of overlapped seedlings in the digital image of at least one seedling comprises evaluating an energy function based on proposed configurations of at least partial primary paths of overlapped seedlings using the following heuristics: primary paths do not make unnaturally sharp turns and seedling edges should be used as much as possible.

18. The method of claim 14 wherein separately identifying a plurality of overlapped seedlings in the digital image of at least one seedling comprises evaluating an energy function based on proposed configurations of at least partial primary paths of overlapped seedlings using the following heuristics: primary paths should not make unnaturally sharp turns, seedling edges should be used as much as possible, and all primary axes should have a separation point between the hypocotyl and the radicle.

19. A method for automatically analyzing a plurality of seedlings germinated from a plurality of seeds, comprising:
   capturing a digital image of each of the plurality of seedlings;
   identifying each of the plurality of seedlings in the captured digital image;
   determining a primary path of each of the plurality of seedlings;
   determining at least one value from the primary path of each of the plurality of seedlings;
   determining a seed vigor index from at least the values determined from the primary path of each of the plurality of seedlings;
   determining a first locus of points indicating the hypocotyl of at least one seedling;
   determining a second locus of points indicating the radicle of the at least one seedling;
   overlaying the first and second loci over an image of the seedlings to generate a composite image; and
   displaying the composite image.

20. The method of claim 19 wherein displaying the composite image comprises displaying the composite image on a video display terminal.

21. The method of claim 19 wherein displaying the composite image comprises printing the image on a printer or plotter.

22. A method of automatically analyzing a plurality of seedlings germinated from a plurality of seeds, comprising:
   capturing a digital image of each of the plurality of seedlings;
   identifying each of the plurality of seedlings in the captured digital image;
   determining a primary path of each of the plurality of seedlings;
   determining a separation point between the hypocotyl and the radicle of each of the plurality of seedlings;
   determining a hypocotyl length value corresponding to the length of the hypocotyl of each of the plurality of seedlings and a radicle length value corresponding to the length of the radicle of each of the plurality of seedlings; and
   determining a seed vigor index from at least the hypocotyl length value and the radicle length value.

23. A method of automatically analyzing a plurality of seedlings germinated from a plurality of seeds, comprising:
   capturing a digital image of each of the plurality of seedlings;
   identifying each of the plurality of seedlings in the captured digital image;
   determining a primary path of each of the plurality of seedlings including determining for each of the plurality of seedlings a locus of pixels, the locus of pixels corresponding to the primary path of the respective seedling and the locus of pixels being one pixel in width;

determining at least one value from the primary path of each of the plurality of seedlings; and determining a seed vigor index from at least the values determined from the primary path of each of the plurality of seedlings.

24. A method of automatically analyzing a plurality of seedlings germinated from a plurality of seeds, comprising:

capturing a digital image of each of the plurality of seedlings;

identifying a plurality of overlapped seedlings in the digital image of at least one of the plurality of seedlings, and:

determining a primary path of each of the overlapped seedlings determining from the primary path for each of the overlapped seedlings a length value corresponding to an overall length of that overlapped seedling; and determining a seed vigor index from at least the length values of each of the overlapped seedlings.

25. The method of claim 24 wherein identifying a plurality of overlapped seedlings in the digital image of at least one seedling comprises evaluating an energy function.

26. The method of claim 24 wherein identifying a plurality of overlapped seedlings in the digital image of at least one seedling comprises evaluating an energy function based on proposed configurations of at least partial primary paths of overlapped seedlings.

27. The method of claim 24 wherein identifying a plurality of overlapped seedlings in the digital image of at least one seedling comprises evaluating an energy function based on proposed configurations of at least partial primary paths of overlapped seedlings using the following heuristics: primary paths do not make unnaturally sharp turns and seedling edges should be used as much as possible.

28. The method of claim 24 wherein identifying a plurality of overlapped seedlings in the digital image of at least one seedling comprises evaluating an energy function based on proposed configurations of at least partial primary paths of overlapped seedlings using the following heuristics: primary paths should not make unnaturally sharp turns, seedling edges should be used as much as possible, and all primary axes should have a separation point between the hypocotyl and the radicle.

29. A method of automatically analyzing a plurality of seedlings germinated from a plurality of seeds, comprising:

capturing a digital image of each of the plurality of seedlings;

identifying a plurality of overlapped seedlings in the digital image of at least one of the plurality of seedlings, and:

determining a primary path of each of the overlapped seedlings determining from the primary path for each of the overlapped seedlings a length value corresponding to the length of at least one of the hypocotyl of that separately identified overlapped seedling and the radicle of that separately identified overlapped seedling; and determining a seed vigor index from at least the length values of each of the overlapped seedlings.

30. The method of claim 29 wherein identifying a plurality of overlapped seedlings in the digital image of at least one seedling comprises evaluating an energy function.

31. The method of claim 29 wherein identifying a plurality of overlapped seedlings in the digital image of at least one seedling comprises evaluating an energy function based on proposed configurations of at least partial primary paths of overlapped seedlings.

32. The method of claim 29 wherein identifying a plurality of overlapped seedlings in the digital image of at least one seedling comprises evaluating an energy function based on proposed configurations of at least partial primary paths of overlapped seedlings using the following heuristics: primary paths do not make unnaturally sharp turns and seedling edges should be used as much as possible.

33. The method of claim 29 wherein identifying a plurality of overlapped seedlings in the digital image of at least one seedling comprises evaluating an energy function based on proposed configurations of at least partial primary paths of overlapped seedlings using the following heuristics: primary paths should not make unnaturally sharp turns, seedling edges should be used as much as possible, and all primary axes should have a separation point between the hypocotyl and the radicle.

34. A method of automatically analyzing a plurality of seedlings germinated from a plurality of seeds, comprising:

capturing a digital image of each of the plurality of seedlings;

identifying a plurality of overlapped seedlings in the digital image of at least one of the plurality of seedlings, and:

determining a primary path of each of the overlapped seedlings determining from the primary path for each of the overlapped seedlings a hypocotyl length value corresponding to the length of the hypocotyl of that overlapped seedling and a radicle length value corresponding to the length of the radicle of that overlapped seedling; and determining a seed vigor index from at least the plurality of hypocotyl length values and at least the plurality of radicle length values.

35. The method of claim 34 wherein identifying a plurality of overlapped seedlings in the digital image of at least one seedling comprises evaluating an energy function.

36. The method of claim 34 wherein identifying a plurality of overlapped seedlings in the digital image of at least one seedling comprises evaluating an energy function based on proposed configurations of at least partial primary paths of overlapped seedlings.

37. The method of claim 34 wherein identifying a plurality of overlapped seedlings in the digital image of at least one seedling comprises evaluating an energy function based on proposed configurations of at least partial primary paths of overlapped seedlings using the following heuristics: primary paths do not make unnaturally sharp turns and seedling edges should be used as much as possible.

38. The method of claim 34 wherein identifying a plurality of overlapped seedlings in the digital image of at least one seedling comprises evaluating an energy function based on proposed configurations of at least partial primary paths of overlapped seedlings using the following heuristics: primary paths should not make unnaturally sharp turns, seedling edges should be used as much as possible, and all primary axes should have a separation point between the hypocotyl and the radicle.

39. A method of automatically analyzing a plurality of seedlings germinated from a plurality of seeds, comprising:

capturing a digital image of each of the plurality of seedlings;

identifying each of the plurality of seedlings in the captured digital image;

determining a primary path of each of the plurality of seedlings;

determining at least one value from the primary path of each of the plurality of seedlings;

determining a seed vigor index from at least the values determined from the primary path of each of the plurality of seedlings;

determining a first locus of points indicating the hypocotyl of at least one seedling;

determining a second locus of points indicating the radicle of the at least one seedling;

overlaying the first and second loci over an image of the seedlings to generate a composite image; and displaying the composite image.

40. The method of claim 39 wherein displaying the composite image comprises displaying the composite image on a video display terminal.

41. The method of claim 39 wherein displaying the composite image comprises printing the image on a printer or plotter.

\* \* \* \* \*